US008784190B2

(12) United States Patent
Thompson et al.

(10) Patent No.: US 8,784,190 B2
(45) Date of Patent: Jul. 22, 2014

(54) GAMING SYSTEM AND METHOD PROVIDING OPTIMIZED INCENTIVES TO DELAY EXPECTED TERMINATION OF A GAMING SESSION

(75) Inventors: Adam J. Thompson, Henderson, NV (US); Eugene T. Bond, Laguna Niguel, CA (US); Richard A. Powell, Henderson, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/403,667

(22) Filed: Feb. 23, 2012

(65) Prior Publication Data

US 2013/0225263 A1 Aug. 29, 2013

(51) Int. Cl.
*A63F 13/00* (2014.01)

(52) U.S. Cl.
USPC .................... 463/25; 463/19; 463/20; 463/30

(58) Field of Classification Search
USPC .......................................... 463/19, 20, 25, 30
See application file for complete search history.

(56) References Cited

U.S. PATENT DOCUMENTS

| | | | |
|---|---|---|---|
| 4,624,459 | A | 11/1986 | Kaufman |
| 4,722,554 | A | 2/1988 | Pettit |
| 4,815,741 | A | 3/1989 | Small |
| 4,982,346 | A | 1/1991 | Girouard et al. |
| 5,057,915 | A | 10/1991 | Von Kohorn |
| 5,080,364 | A | 1/1992 | Seidman |
| 5,135,224 | A | 8/1992 | Yamamoto et al. |
| 5,137,278 | A | 8/1992 | Schilling et al. |
| 5,269,522 | A | 12/1993 | Chagoll et al. |
| 5,362,051 | A | 11/1994 | Swafford, Jr. et al. |
| 5,373,440 | A | 12/1994 | Cohen et al. |
| 5,392,066 | A | 2/1995 | Fisher et al. |
| 5,397,125 | A | 3/1995 | Adams |
| 5,449,173 | A | 9/1995 | Thomas et al. |
| 5,551,692 | A | 9/1996 | Pettit et al. |
| 5,555,991 | A | 9/1996 | Hart |
| 5,570,885 | A | 11/1996 | Ornstein |
| 5,620,182 | A | 4/1997 | Rossides |
| 5,630,754 | A | 5/1997 | Rebane |
| 5,643,088 | A | 7/1997 | Vaughn et al. |
| 5,695,402 | A | 12/1997 | Stupak |
| 5,697,844 | A | 12/1997 | Von Kohorn |
| 5,718,431 | A | 2/1998 | Ornstein |
| 5,758,875 | A | 6/1998 | Giacalone, Jr. |
| 5,761,647 | A | 6/1998 | Boushy |
| 5,772,509 | A | 6/1998 | Weiss |
| 5,791,991 | A | 8/1998 | Small |
| 5,806,852 | A | 9/1998 | Howes |
| 5,813,913 | A | 9/1998 | Berner et al. |

(Continued)

*Primary Examiner* — Paul A D'Agostino
*Assistant Examiner* — Brandon Gray
(74) *Attorney, Agent, or Firm* — Neal, Gerber & Eisenberg LLP

(57) ABSTRACT

Various embodiments of the present disclosure provide a gaming system and method providing one or more incentives to delay termination of a gaming session. In general, for a player, the gaming system utilizes gaming session data collected from the player's previous gaming sessions to determine one or more termination causation events for the player. When a designated number of the termination causation events occur during a current gaming session of the player, the gaming system provides an incentive to the player, wherein the incentive is configured to cause the player to delay expected termination of the player's current gaming session. In certain embodiments, the gaming system optimizes an incentive available to be provided to a player based on the effectiveness of prior incentives provided to the player.

20 Claims, 9 Drawing Sheets

(56) References Cited

U.S. PATENT DOCUMENTS

| | | | |
|---|---|---|---|
| 5,816,918 | A | 10/1998 | Kelly et al. |
| 5,833,538 | A | 11/1998 | Weiss |
| 5,851,147 | A | 12/1998 | Stupak et al. |
| 5,857,175 | A | 1/1999 | Day et al. |
| 5,910,048 | A | 6/1999 | Feinberg |
| 5,911,071 | A | 6/1999 | Jordan |
| 5,918,211 | A | 6/1999 | Sloane |
| 5,928,082 | A | 7/1999 | Clapper, Jr. |
| 5,933,811 | A | 8/1999 | Angles et al. |
| 5,941,772 | A | 8/1999 | Paige |
| 5,946,646 | A | 8/1999 | Schena et al. |
| 5,946,664 | A | 8/1999 | Ebisawa |
| 5,950,173 | A | 9/1999 | Perkowski |
| 5,962,831 | A | 10/1999 | Byrley |
| 5,991,736 | A | 11/1999 | Ferguson et al. |
| 6,009,410 | A | 12/1999 | LeMole et al. |
| 6,009,412 | A | 12/1999 | Storey |
| 6,024,642 | A | 2/2000 | Stupak |
| 6,039,648 | A | 3/2000 | Guinn et al. |
| 6,048,268 | A | 4/2000 | Humble |
| 6,056,289 | A | 5/2000 | Clapper, Jr. |
| 6,102,400 | A | 8/2000 | Scott et al. |
| 6,106,393 | A | 8/2000 | Sunaga et al. |
| 6,110,041 | A | 8/2000 | Walker et al. |
| 6,113,098 | A | 9/2000 | Adams |
| 6,113,492 | A | 9/2000 | Walker et al. |
| 6,113,495 | A | 9/2000 | Walker |
| 6,138,273 | A | 10/2000 | Sturges |
| 6,142,875 | A | 11/2000 | Kodachi et al. |
| 6,151,587 | A | 11/2000 | Matthias |
| 6,168,522 | B1 | 1/2001 | Walker et al. |
| 6,173,267 | B1 | 1/2001 | Cairns |
| 6,174,233 | B1 | 1/2001 | Sunaga et al. |
| 6,183,366 | B1 | 2/2001 | Goldberg |
| 6,186,893 | B1 | 2/2001 | Walker et al. |
| 6,193,608 | B1 | 2/2001 | Walker et al. |
| 6,196,920 | B1 | 3/2001 | Spaur et al. |
| 6,213,874 | B1 | 4/2001 | Heflin |
| 6,238,288 | B1 | 5/2001 | Walker et al. |
| 6,267,672 | B1 | 7/2001 | Vance |
| 6,267,675 | B1 | 7/2001 | Lee |
| 6,293,864 | B1 | 9/2001 | Romero |
| 6,293,866 | B1 | 9/2001 | Walker et al. |
| 6,299,531 | B1 | 10/2001 | Bommarito |
| 6,302,793 | B1 | 10/2001 | Fertitta, III et al. |
| 6,306,034 | B1 | 10/2001 | Sakamoto et al. |
| 6,306,035 | B1 | 10/2001 | Kelly et al. |
| 6,322,309 | B1 | 11/2001 | Thomas et al. |
| 6,324,519 | B1 | 11/2001 | Eldering |
| 6,328,648 | B1 | 12/2001 | Walker et al. |
| 6,332,099 | B1 | 12/2001 | Heidel et al. |
| 6,379,251 | B1 | 4/2002 | Auxier et al. |
| 6,381,626 | B1 | 4/2002 | DeLeo et al. |
| 6,390,917 | B1 | 5/2002 | Walker et al. |
| 6,443,840 | B2 | 9/2002 | Von Kohon |
| 6,443,843 | B1 | 9/2002 | Walker et al. |
| 6,447,395 | B1 | 9/2002 | Stevens |
| 6,484,148 | B1 | 11/2002 | Boyd |
| 6,500,068 | B2 | 12/2002 | Walker et al. |
| 6,520,856 | B1 | 2/2003 | Walker et al. |
| 6,523,824 | B1 | 2/2003 | Colapinto et al. |
| 6,540,609 | B1 | 4/2003 | Paige |
| 6,558,256 | B1 | 5/2003 | Saunders |
| 6,567,786 | B1 | 5/2003 | Bibelnieks et al. |
| 6,567,842 | B2 | 5/2003 | DeLeo et al. |
| 6,569,013 | B1 | 5/2003 | Taylor |
| 6,582,310 | B1 | 6/2003 | Walker et al. |
| 6,595,859 | B2 | 7/2003 | Lynn |
| 6,606,745 | B2 | 8/2003 | Maggio |
| 6,609,969 | B1 | 8/2003 | Luciano et al. |
| 6,616,533 | B1 | 9/2003 | Rashkovskiy |
| 6,620,046 | B2 | 9/2003 | Rowe |
| 6,625,578 | B2 | 9/2003 | Spaur et al. |
| 6,633,850 | B1 | 10/2003 | Gabbard et al. |
| 6,634,550 | B1 | 10/2003 | Walker et al. |
| 6,645,068 | B1 | 11/2003 | Kelly et al. |
| 6,656,050 | B2 | 12/2003 | Busch et al. |
| 6,679,492 | B2 | 1/2004 | Markowiak |
| 6,722,985 | B2 | 4/2004 | Criss-Puszkiewicz et al. |
| 6,739,973 | B1 | 5/2004 | Lucchesi et al. |
| 6,764,395 | B1 | 7/2004 | Guyett |
| 6,769,985 | B1 | 8/2004 | Laakso et al. |
| 6,786,824 | B2 | 9/2004 | Cannon |
| 6,790,142 | B2 | 9/2004 | Okada et al. |
| 6,796,900 | B2 | 9/2004 | Baerlocher et al. |
| 6,848,995 | B1 | 2/2005 | Walker et al. |
| 6,848,996 | B2 | 2/2005 | Hecht et al. |
| 6,857,959 | B1 | 2/2005 | Nguyen |
| 6,872,138 | B2 | 3/2005 | Akers |
| 6,882,978 | B2 | 4/2005 | Ebisawa |
| 6,885,995 | B2 | 4/2005 | Bell et al. |
| 6,890,256 | B2 | 5/2005 | Walker et al. |
| 6,899,626 | B1 | 5/2005 | Luciano et al. |
| 6,907,400 | B1 | 6/2005 | Matsko et al. |
| 6,908,387 | B2 | 6/2005 | Hedrick et al. |
| 6,912,504 | B1 | 6/2005 | Rashkovskiy |
| 6,928,414 | B1 | 8/2005 | Kim |
| 6,966,836 | B1 | 11/2005 | Rush et al. |
| 7,025,674 | B2 | 4/2006 | Adams et al. |
| 7,033,270 | B2 | 4/2006 | Baerlocher et al. |
| 7,038,637 | B1 | 5/2006 | Eller et al. |
| 7,052,392 | B2 | 5/2006 | Tessmer et al. |
| 7,054,831 | B2 | 5/2006 | Koenig |
| 7,063,618 | B2 | 6/2006 | Walker et al. |
| 7,076,445 | B1 | 7/2006 | Cartwright |
| 7,085,733 | B2 | 8/2006 | Ebisawa |
| 7,094,149 | B2 | 8/2006 | Walker et al. |
| 7,111,845 | B2 | 9/2006 | Walker et al. |
| 7,121,943 | B2 | 10/2006 | Webb et al. |
| 7,139,725 | B1 | 11/2006 | Moyerson |
| 7,168,617 | B2 | 1/2007 | Walker et al. |
| 7,210,998 | B2 | 5/2007 | Kazaoka et al. |
| 7,241,219 | B2 | 7/2007 | Walker et al. |
| 7,258,613 | B2 | 8/2007 | Lucchesi et al. |
| 7,311,605 | B2 | 12/2007 | Moser |
| 7,326,110 | B2 | 2/2008 | Webb et al. |
| 7,355,112 | B2 | 4/2008 | Laakso |
| 7,357,714 | B2 | 4/2008 | Tessmer et al. |
| 7,416,485 | B2 | 8/2008 | Walker et al. |
| 7,455,586 | B2 | 11/2008 | Nguyen et al. |
| 7,485,040 | B2 | 2/2009 | Walker et al. |
| 7,585,222 | B2 | 9/2009 | Muir |
| 7,597,620 | B2 | 10/2009 | Webb et al. |
| 7,611,411 | B2 | 11/2009 | Griswold et al. |
| 7,617,151 | B2 | 11/2009 | Rowe |
| 7,666,085 | B2 | 2/2010 | Vorias et al. |
| 7,674,180 | B2 | 3/2010 | Graham et al. |
| 7,753,789 | B2 | 7/2010 | Walker et al. |
| 7,771,271 | B2 | 8/2010 | Walker et al. |
| 7,780,525 | B2 | 8/2010 | Walker et al. |
| 7,785,186 | B2 | 8/2010 | Tessmer et al. |
| 7,871,327 | B2 | 1/2011 | Walker et al. |
| 7,878,901 | B2 | 2/2011 | Walker et al. |
| 7,914,372 | B2 | 3/2011 | Tessmer et al. |
| 7,918,736 | B2 | 4/2011 | Walker et al. |
| 7,955,172 | B2 | 6/2011 | Walker et al. |
| 7,963,844 | B2 | 6/2011 | Walker et al. |
| 7,993,198 | B2 | 8/2011 | Walker et al. |
| 7,993,199 | B2 | 8/2011 | Iddings et al. |
| 7,997,972 | B2 | 8/2011 | Nguyen et al. |
| 8,012,009 | B2 | 9/2011 | Iddings et al. |
| 8,016,674 | B2 | 9/2011 | Lucchesi et al. |
| 8,057,298 | B2 | 11/2011 | Nguyen et al. |
| 8,096,873 | B2 | 1/2012 | Walker et al. |
| 2001/0041609 | A1 | 11/2001 | Oranges et al. |
| 2002/0002070 | A1 | 1/2002 | Romero |
| 2002/0002075 | A1 | 1/2002 | Rowe |
| 2002/0006820 | A1 | 1/2002 | Romero |
| 2002/0039921 | A1 | 4/2002 | Rowe et al. |
| 2002/0090990 | A1 | 7/2002 | Joshi et al. |
| 2002/0096827 | A1 | 7/2002 | Markowiak |
| 2002/0142824 | A1 | 10/2002 | Kazaoka et al. |
| 2002/0155891 | A1 | 10/2002 | Okada et al. |
| 2002/0177479 | A1 | 11/2002 | Walker et al. |

(56) References Cited

U.S. PATENT DOCUMENTS

| | | | |
|---|---|---|---|
| 2003/0004871 A1 | 1/2003 | Rowe | |
| 2003/0054881 A1 | 3/2003 | Hedrick et al. | |
| 2003/0054888 A1 | 3/2003 | Walker et al. | |
| 2003/0073489 A1 | 4/2003 | Hecht et al. | |
| 2003/0073491 A1 | 4/2003 | Hecht et al. | |
| 2003/0092477 A1 | 5/2003 | Luciano, Jr. et al. | |
| 2003/0109306 A1 | 6/2003 | Karmarkar | |
| 2003/0141660 A1 | 7/2003 | Colapinto et al. | |
| 2003/0190944 A1 | 10/2003 | Manfredi et al. | |
| 2003/0195024 A1 | 10/2003 | Slattery | |
| 2003/0199298 A1 | 10/2003 | Baerlocher et al. | |
| 2003/0199312 A1 | 10/2003 | Walker et al. | |
| 2003/0216169 A1 | 11/2003 | Walker et al. | |
| 2003/0232640 A1 | 12/2003 | Walker et al. | |
| 2003/0236115 A1 | 12/2003 | Chamberlain | |
| 2004/0053695 A1 | 3/2004 | Mattice et al. | |
| 2004/0106449 A1 | 6/2004 | Walker et al. | |
| 2004/0116179 A1 | 6/2004 | Nicely et al. | |
| 2004/0116183 A1 | 6/2004 | Prindle | |
| 2004/0142739 A1 | 7/2004 | Loose et al. | |
| 2004/0142747 A1 | 7/2004 | Pryzby | |
| 2004/0152518 A1 | 8/2004 | Kogo | |
| 2004/0192442 A1 | 9/2004 | Wells et al. | |
| 2004/0209685 A1 | 10/2004 | Lucchesi et al. | |
| 2004/0242307 A1 | 12/2004 | Laakso et al. | |
| 2005/0014558 A1 | 1/2005 | Estey | |
| 2005/0054439 A1 | 3/2005 | Rowe et al. | |
| 2005/0054441 A1 | 3/2005 | Landrum et al. | |
| 2005/0059494 A1 | 3/2005 | Kammler | |
| 2005/0215311 A1 | 9/2005 | Hornik et al. | |
| 2005/0277469 A1 | 12/2005 | Pryzby et al. | |
| 2005/0282631 A1 | 12/2005 | Bonney et al. | |
| 2006/0009284 A1 | 1/2006 | Schwartz et al. | |
| 2006/0059046 A1 | 3/2006 | Mohr et al. | |
| 2006/0063587 A1 | 3/2006 | Manzo | |
| 2006/0068872 A1 | 3/2006 | Walker et al. | |
| 2006/0079315 A1 | 4/2006 | Okada | |
| 2006/0084496 A1 | 4/2006 | Jaffe et al. | |
| 2006/0084501 A1 | 4/2006 | Walker et al. | |
| 2006/0121972 A1 | 6/2006 | Walker et al. | |
| 2006/0121992 A1 | 6/2006 | Bortnik et al. | |
| 2006/0148551 A1* | 7/2006 | Walker et al. | 463/16 |
| 2006/0154722 A1 | 7/2006 | Walker et al. | |
| 2006/0194631 A1 | 8/2006 | Rowe et al. | |
| 2006/0205513 A1 | 9/2006 | Breckner et al. | |
| 2006/0242020 A1 | 10/2006 | Walker et al. | |
| 2006/0247037 A1 | 11/2006 | Park | |
| 2006/0252482 A1 | 11/2006 | Walker et al. | |
| 2006/0258422 A1 | 11/2006 | Walker et al. | |
| 2007/0015573 A1 | 1/2007 | Angell et al. | |
| 2007/0060252 A1 | 3/2007 | Taylor | |
| 2007/0077981 A1 | 4/2007 | Hungate et al. | |
| 2007/0135193 A1 | 6/2007 | Nicely | |
| 2007/0213123 A1 | 9/2007 | Walker et al. | |
| 2008/0070669 A1 | 3/2008 | Walker et al. | |
| 2008/0076496 A1 | 3/2008 | Baerlocher et al. | |
| 2008/0076534 A1 | 3/2008 | Iddings et al. | |
| 2008/0076542 A1 | 3/2008 | Iddings et al. | |
| 2008/0076576 A1* | 3/2008 | Graham et al. | 463/42 |
| 2008/0108419 A1 | 5/2008 | Dimichele et al. | |
| 2008/0161090 A1 | 7/2008 | Okada | |
| 2008/0182655 A1 | 7/2008 | De Waal et al. | |
| 2009/0124384 A1* | 5/2009 | Smith et al. | 463/42 |
| 2010/0298044 A1* | 11/2010 | Acres | 463/25 |
| 2011/0281646 A1 | 11/2011 | Nguyen et al. | |
| 2012/0184349 A1* | 7/2012 | Barclay et al. | 463/20 |

* cited by examiner

GAMING SYSTEM AND METHOD PROVIDING OPTIMIZED INCENTIVES TO DELAY EXPECTED TERMINATION OF A GAMING SESSION

CROSS REFERENCE TO RELATED APPLICATIONS

This application relates to the following commonly owned co-pending patent application: "GAMING SYSTEM AND METHOD PROVIDING ONE OR MORE INCENTIVES TO DELAY EXPECTED TERMINATION OF A GAMING SESSION," U.S. patent application Ser. No. 13/403,664.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable the player to wager a minimum number of credits, such as one credit (e.g., one cent, nickel, dime, quarter, or dollar), up to a maximum quantity of credits, such as five credits. The gaming machine may enable the player to place this wager a single time or multiple times in a single play of the primary game. For instance, a gaming machine configured to operate a slot game may have one or more paylines, and the gaming machine may enable a player to place a wager on each payline for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Player tracking systems are also known. Player tracking systems enable gaming establishments to recognize the value of customer loyalty through identifying frequent customers and rewarding them for their patronage. The cumulative history of a particular player's gaming activity, which is included in a player profile, enables gaming establishments to target individual players with direct marketing promotions or customized compensation plans. In existing player tracking systems, a player is issued a player identification card that has an encoded player identification number that uniquely identifies the player. Player tracking on a gaming machine is typically accomplished with a card reader supported by the gaming machine. When a player first sits down at the gaming machine, the player inserts the player's player identification card into the card reader. The card reader reads the player identification number off the player tracking card and communicates information regarding the player's subsequent gaming activity through a network to a central computer. Based on this communicated information, the gaming establishment classifies the player and provides one or more benefits based on the classification when one or more conditions are satisfied.

Due to the widespread use of player tracking systems by both players and gaming establishments, there is a continuing need to provide new ways to use player tracking systems or similar gaming activity tracking systems and, more particularly, utilize all or part of the cumulative gaming activity history tracked by these systems to enhance and extend a player's gaming experience.

SUMMARY

Various embodiments of the present disclosure provide a gaming system and method providing one or more incentives to delay expected termination of a gaming session. In general, for a given player, the gaming system utilizes gaming session data collected from the player's previous gaming sessions to determine one or more termination causation events for the player. Prior to, contemporaneously with, or shortly after a designated number (such as one) of the termination causation events occur during a current gaming session of the player, the gaming system provides an incentive to the player, wherein the incentive is configured to cause the player to delay expected termination of the player's current gaming session.

More specifically, in certain embodiments, the gaming system collects and stores gaming session data associated with the player's gaming activity during one or more gaming sessions. The gaming system uses the stored gaming session data to determine one or more termination causation events. Termination causation events are events that the gaming system predicts will cause the player to terminate a gaming session if they occur during the gaming session. Prior to, contemporaneously with, or shortly after the occurrence of a designated number of the termination causation events during a subsequent gaming session of the player, the gaming system provides an incentive to the player, wherein the incentive is configured to cause the player to delay expected termination of the subsequent gaming session. It should thus be appreciated that the gaming system of the present disclosure predicts when a player is likely to terminate a gaming session and, prior to, contemporaneously with, or shortly after that expected termination point, offers an incentive to the player, wherein the incentive is configured to cause the player to delay expected termination of that gaming session. For example, the gaming system periodically collects and stores data representing a credit balance of a player during a plurality of gaming sessions. In this example, based on this data, the gaming system predicts that the player is likely to terminate a gaming session when the player's credit balance falls below a maximum wager amount (i.e., determines a termination causation event). Accordingly, when the player's credit balance falls below the maximum wager amount during a subsequent gaming session, the gaming system provides the player an incentive of one free spin.

In various embodiments, the gaming system optimizes an incentive available to be provided to a player based on the effectiveness of previously provided incentives. In one embodiment, the gaming system modifies an ineffective incentive previously provided to a player (such as an incentive that did not cause the player to delay expected termination of the gaming session for at least a designated period of time or for at least a designated quantity of plays of one or more games) by changing a value of that ineffective incentive and/or changing an incentive type of that ineffective incentive. In this embodiment, the gaming system continues changing the incentive type and/or the value of an ineffective incentive until that incentive becomes effective. Continuing with the above-described example, if the player's credit balance falls below the maximum wager amount (i.e., if the termination causation event occurs) in the subsequent gaming session, the gaming system provides the player the incentive of one free spin, and the player nevertheless terminates the subsequent gaming session, the gaming system determines that the incentive was ineffective at causing the player to delay expected termination of the subsequent gaming session. Based on this information, the gaming system modifies the ineffective incentive such that, for a second subsequent gaming session, the gaming system provides the player with two free spins when the player's credit balance falls below the maximum wager amount. In other words, in this example the gaming system increased the value of the ineffective incentive to further persuade the player to delay expected termination of the second subsequent gaming session.

Accordingly, the present disclosure utilizes data collected from prior gaming sessions of a player to determine when to provide incentives to the player, wherein the incentives are configured to extend and enhance the player's gaming experience in subsequent gaming sessions.

Additional features and advantages are described herein, and will be apparent from, the following Detailed Description and the Figures.

DETAILED DESCRIPTION

Providing One or More Incentives to Delay Expected Termination of a Gaming Session Various embodiments of the present disclosure provide a gaming system and method providing one or more incentives to delay expected termination of a gaming session. In general, for a given player, the gaming system utilizes gaming session data collected from the player's previous gaming sessions to determine one or more termination causation events for the player. Prior to, contemporaneously with, or shortly after a designated number (such as one) of the termination causation events occur during a current gaming session of the player, the gaming system provides an incentive to the player, wherein the incentive is configured to cause the player to delay expected termination of the player's current gaming session.

More specifically, in various embodiments, for each of one or more gaming sessions of a player, the gaming system collects and stores individual gaming session data associated with the player's gaming activity during that gaming session. For each such gaming session, the individual gaming session data for that gaming session includes individual gaming session termination data associated with a termination of that gaming session. At various points in time, the gaming system uses the collected individual gaming session data and, more specifically, the individual gaming session termination data of that individual gaming session data, for the one or more gaming sessions to determine one or more termination causation events for the player or, in certain instances, to modify one or more existing termination causation events for the player. The termination causation events are events that the gaming system predicts will cause the player to terminate a gaming session. For a subsequent gaming session, the gaming system collects and stores subsequent individual gaming session data associated with the player's gaming activity during the subsequent gaming session. During the subsequent gaming session, the gaming system determines, based on the subsequent individual gaming session data, whether a designated number (such as one) of the determined termination causation events occurs. Prior to, contemporaneously with, or shortly after a designated number (such as one) of the determined termination causation events occur, the gaming system provides an incentive to the player.

Figure 1:
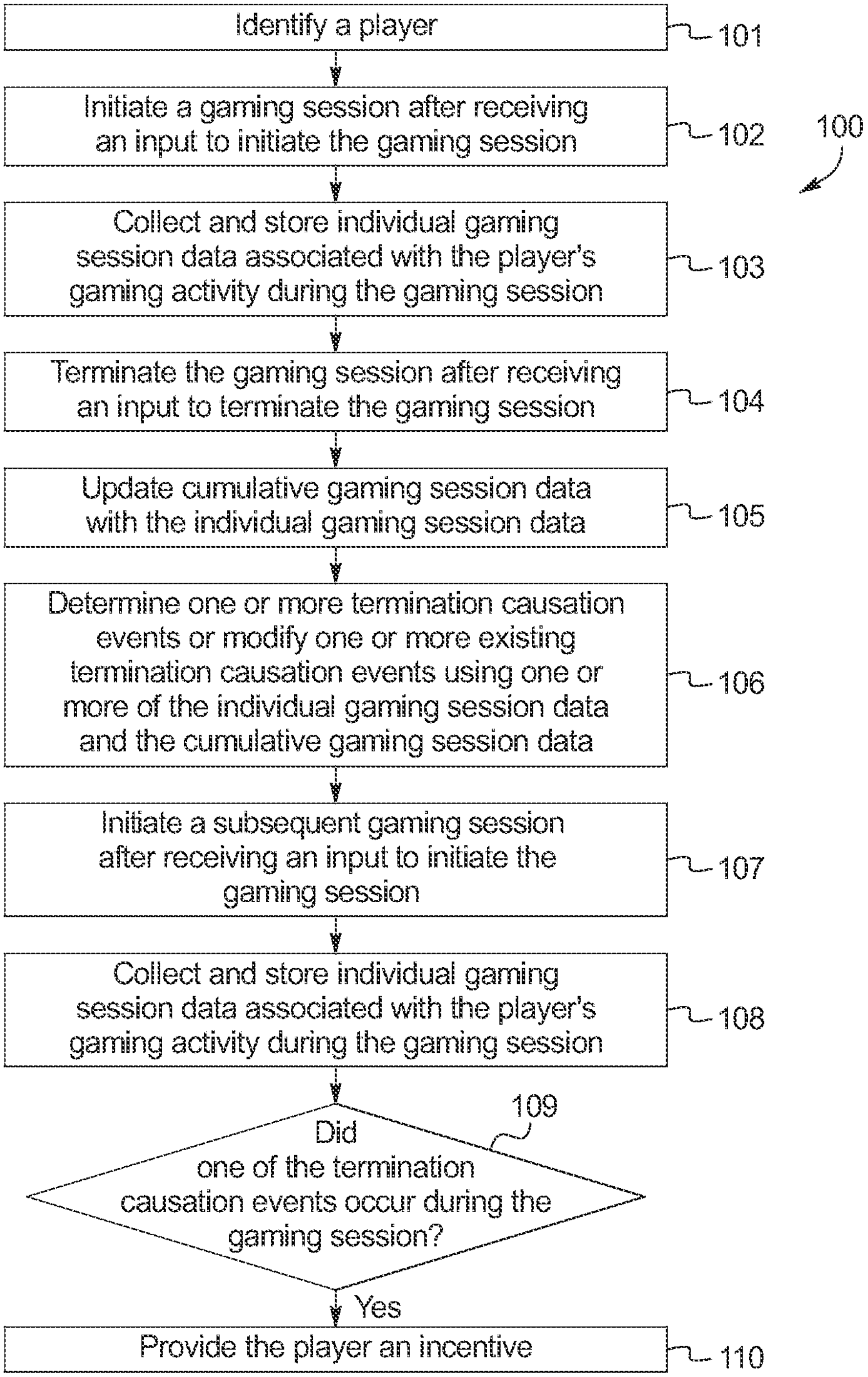
FIG. 1 is a flowchart illustrating an example method of operating an embodiment of the gaming system of the present disclosure providing one or more incentives to delay expected termination of a gaming session.

FIG. 1 illustrates a flowchart of an example of a process or method 100 for operating a gaming system of the present disclosure. In one embodiment, process 100 is represented by a set of instructions stored in one or more memories and executed by one or more processors or controllers. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system identifies a player, as indicated by block 101. After receiving a request to initiate a gaming session (such as via insertion of a player tracking card of the player into a card reader of the gaming system), the gaming system initiates the gaming session, as indicated by block 102. During the gaming session, the gaming system collects and stores individual gaming session data associated with the player's gaming activity during the gaming session in a database, as indicated by block 103. After receiving a request to terminate the gaming session (such via removal of the player tracking card from the card reader), the gaming system terminates the gaming session, as indicated by block 104.

The gaming system updates cumulative gaming session data stored in the database with the collected and stored individual gaming session data, as indicated by block 105. The gaming system determines one or more termination causation events for the player or modifies one or more existing termination causation events for the player using one or more of: (a) the individual gaming session data, and (b) the cumulative gaming session data, as indicated by block 106. After receiving another request to initiate a subsequent gaming session, the gaming system initiates the subsequent gaming session, as indicated by block 107. During the subsequent gaming session, the gaming system collects and stores individual gaming session data associated with the player's gaming activity during the subsequent gaming session in a database, as indicated by block 108. During the subsequent gaming session, the gaming system determines whether any of the termination causation events occur, as indicated by diamond 109. If the gaming system determines that one of the termination causation events occurs, the gaming system provides the player with an incentive, as indicated by block 110.

In certain embodiments, the gaming system includes a player identification and data collection component. Generally, the player identification and data collection component: (a) identifies a player of an electronic gaming machine ("EGM," as further described below), (b) collects individual gaming session data for a gaming session of that identified player at the EGM, and (c) stores the collected individual gaming session data in one or more databases (referred to herein as a "database" for brevity). Additionally, in these embodiments, the gaming system includes one or more analytic engine components. Generally, for a given player, the analytic engine component(s): (a) uses the stored individual gaming session data to determine one or more termination causation events for that player or to modify one or more existing termination causation events for that player, (b) determines whether any of the termination causation events occur during a gaming session of that player such that an incentive should be provided to that player, and (c) determines one or more incentives to provide to that player if one or more of the termination causation events occurs. In one embodiment in which the gaming system includes a central server, central controller, or remote host (described in detail below), the central sever, central controller, or remote host acts as both the player identification and data collection component and the analytic engine component(s).

As generally described above, in various embodiments, the player identification and data collection component is configured to: (a) identify a player of an EGM, (b) collect individual gaming session data for each gaming session of that identified player, and (c) store the collected individual gaming session data in the database. In certain embodiments, the player identification and data collection component determines when a gaming session is initiated by monitoring when a card reader associated with the gaming system (such as a player tracking card reader supported by an EGM) receives a player tracking card associated with a player. The player identification and data collection component uses that player tracking card to identify the player (such as by associating the player with a unique player identification number read from the player tracking card). The player identification and data collection component also monitors when the player tracking card is removed from the card reader, when a cash out input is received by the gaming system, or when the gaming session is otherwise terminated. In various other embodiments, rather than monitoring the insertion and removal of a player tracking card to track the initiation and termination of a player's a gaming session, the player identification and data collection component utilizes: (a) one or more portable devices carried by or associated with the player, such as a cell phone, a radio frequency identification tag, or any other suitable wireless device, to identify the player and monitor when a gaming session is initiated and terminated; and/or (b) any suitable biometric technology or ticket technology to identify the player and monitor when a gaming session is initiated and terminated. It should be appreciated that the player identification and data collection component may identify a player and monitor when a gaming session of that player is initiated and terminated in any suitable manner.

For a given player, the player identification and data collection component stores player identification and demographic data associated with that player in the database. In one embodiment, for a given player, the player identification and data collection component stores data representing that player's: (a) player tracking identification number; (b) first, middle, and last name; (c) gender; and (d) age.

Once the player identification and data collection component has identified a player, and once the player has initiated a gaming session, during the gaming session (or shortly thereafter) the player identification and data collection component collects and stores individual gaming session data associated with that gaming session in the database. It should be appreciated that the player identification and data collection component collects such individual gaming session data in any of a variety of manners (such as any of those described below). In one embodiment, for a gaming session of a player, the player identification and data collection component collects and stores individual gaming session data representing: (a) a time of day at which the gaming session was initiated, (b) an amount of currency deposited by the player during the gaming session, and (c) individual gaming session termination data.

As noted above, the individual gaming session data includes individual gaming session termination data that, since it is part of the individual gaming session data, is collected by the player identification and data collection component and stored in the database. Generally, for a gaming session, the individual gaming session termination data includes data associated with the termination of the gaming session. In one embodiment, for a gaming session of a player, the player identification and data collection component collects and stores individual gaming session termination data representing: (a) a total length of time of the gaming session, and (b) that the player terminated the gaming session immediately following one or more designated events (such as large wins). It should be appreciated that, in certain embodiments, the gaming system does not differentiate between individual gaming session data and individual gaming session termination data.

In certain embodiments, for a given player, the database stores cumulative gaming session data for the player. The cumulative gaming session data represents information associated with each of a plurality of gaming sessions played by the player. That is, the cumulative gaming session data is based on the individual gaming session data collected from each gaming session of the player. In these embodiments, after (or while) the player identification and data collection component collects and stores individual gaming session data for a gaming session, the gaming system updates the cumulative gaming session data using that individual gaming session data. In one embodiment, for a given player, the cumulative gaming session data represents: (a) an average time of day at which a gaming session is initiated for the player, (b) an average amount of currency deposited by the player during a gaming session, and (c) cumulative gaming session termination data.

As noted above, the cumulative gaming session data includes cumulative gaming session termination data. Generally, for a given player, the cumulative gaming session termination data includes data associated with the termination of each gaming session of the player. In one embodiment, for a given player, the cumulative gaming session termination data represents: (a) an average total length of time of a gaming session, and (b) a total quantity of instances in which the player terminated a gaming session immediately following one or more designated events.

As generally described above, at certain frequencies and/or certain points in time (such as once a day, twice a day, at a designated time or times of each day, and/or upon each termination of a gaming session of a player), the analytic engine component(s) uses some or all of the data stored in the database to assess or predict which events that, if they occur during a gaming session of a player, are likely to cause the player to terminate that gaming session. More specifically, the analytic engine component(s) determines one or more termination causation events. In certain instances in which the gaming system has already determined one or more termination causation events for a player, the analytic engine component(s) uses some or all of the data stored in the database to determine whether to modify those existing termination causation events in addition to or instead of determining new termination causation events.

In certain embodiments, the analytic engine component(s): (a) analyzes one or more of the following data: (i) the player information and demographic data, (ii) the individual gaming session data of gaming sessions of the player, and (iii) the cumulative gaming session data of the player; and (b) determines, based on such analysis, one or more termination causation events or modifies, based on such analysis, one or more existing termination causation events. The analytic engine component(s) stores data representing the new or modified termination causation events in the database.

In general, the gaming system determines the termination causation events (and/or determines whether to modify existing termination causation events) by performing an analysis (such as a serial correlation or a regression analysis, as described below, or any other suitable statistical analysis) of relevant data (such as the data listed above) to determine one or more events that, if they occur during a gaming session of a player, are likely to cause the player to terminate that gaming session. That is, the gaming system identifies certain events that may occur during or in association with a gaming session as termination causation events.

In one embodiment, the gaming system determines the termination causation events by performing a serial correlation on certain of the data. Generally, the serial correlation determines the likelihood that one event tends to follow another event. More specifically, in this embodiment, the serial correlation determines the likelihood that termination of a gaming session follows a given event. If the likelihood that termination of a gaming session follows that event is at least a designated likelihood, the gaming system determines that that event is a termination causation event. In one example, the serial correlation performed by the gaming system determines, for each occurrence of a jackpot award (i.e., an event) during a gaming session, the likelihood that that the player will terminate the gaming session following the occurrence of that jackpot award. In this example, the gaming system performed a serial correlation on gaming session data and determined different likelihoods of termination associated with different ranges of jackpot award amounts, as shown in Table 1 below.

TABLE 1

Example Likelihoods of Termination of a Gaming Session Following the Occurrence of Various Jackpot Award Amounts

| Jackpot Award Amount | Likelihood of Termination |
|---|---|
| $0-50 | 15% |
| $50-100 | 28% |
| $100-150 | 54% |
| $150-200 | 64% |
| $200-250 | 77% |

In this example, the gaming system determines that an event is a termination causation event if the gaming system determines that the likelihood that the player will terminate a gaming session following an occurrence of that event is at least 70%. In this example, the likelihood of termination following an occurrence of a jackpot award having an amount of $200 to $250 is 77%. The likelihoods of termination following an occurrence of each of the other jackpot awards in Table 1 are not at least 70%. Thus, in this example, the gaming system determines that the occurrence of a jackpot award having an amount of $200 to $250 is a termination causation event for the player.

In another embodiment, the gaming system determines the termination causation events by performing a regression analysis on certain of the data. Generally, the regression analysis determines how strongly (or weakly) two or more events are correlated. More specifically, in this embodiment, the regression analysis is performed by calculating a regression (such as a linear, quadratic, or other form of regression) on each potential combination of a set of events to determine which of the combinations is an optimal combination of the events that best explains the player's termination of the gaming session. The result of the regression analysis is a model in which each of the events of the optimal combination of the events is associated with a correlation coefficient that represents how influential that event is on termination of a gaming session. The gaming system uses the model to determine a termination causation event based on the optimal combination of the events.

In one example, the gaming system performs a regression analysis on data representing the following factors: (a) initial player balance, (b) maximum bet, and (c) average expected payback percentage to determine how those factors correlate to average gaming session length. In this example, the regression analysis resulted in the following model, which includes an optimal combination of the three events: average gaming session length=15 minutes+(25 seconds)*(initial player balance)+(15 seconds)*(maximum bet)+(50 seconds)*(average expected payback percentage). The gaming system determines the termination causation event for a subsequent gaming session by using the model upon initiation of the subsequent gaming session. For instance, if the player initiates a subsequent gaming session with an initial balance of $20 at a gaming machine having a $2 maximum bet and an average expected payback percentage of 86%, the average gaming session length is 1473 seconds (or 24.55 minutes). Thus, in this instance the termination causation event occurs when the calculated average gaming session length of 1473 seconds expires.

In certain embodiments, the gaming system performs one or more validations of the regressions to ensure the data being analyzed is not flawed. In one example, the gaming system employs the Durbin-Watson test to detect autocorrelation. Information regarding the Durbin-Watson test can be found at http://en.wikipedia.org/wiki/

Durbin%E2%80%93Watson_statistic. In another example, the gaming system utilizes the White test to detect heteroscedasticity. Information regarding the White test can be found at http://en.wikipedia.org/wiki/White_test. Such tests enable the gaming system to determine whether the data is causing a false correlation.

As generally noted above, prior to, contemporaneous with, or shortly after an occurrence of a designated number (such as one) of the termination causation events during a gaming session of a player, the gaming system provides an incentive to the player, wherein the incentive is configured to cause the player to delay expected termination of the gaming session. In various embodiments, each incentive: (a) is of one of a plurality of incentive types, and (b) has an incentive value that may be, for example, an actual value of the incentive assigned by the gaming establishment (such as a casino) or a perceived value of the incentive from a player's point of view.

One of the incentive types is an award that the gaming system provides prior to, contemporaneous with, or shortly after the occurrence of one of the termination events during or in association with a gaming session. For example, in various embodiments, the incentive is one or more of the following awards: (a) a multiplier for use in one or more future plays or one or more wagering games during the gaming session; (b) one or more free plays of one or more wagering games during the gaming session; (c) a designated quantity of currency or credits; (d) one or more plays of one or more secondary or bonus games; (e) one or more lottery based awards, such as lottery or drawing tickets; (f) a wager match for one or more plays of one or more wagering games during the gaming session; (g) an increase in the average expected payback percentage of one or more wagering games for one or more plays of those wagering games; (h) one or more comps, such as a free dinner, a free night's stay at a hotel, a high value product such as a free car, or a low value product such as a free teddy bear; (i) one or more bonus credits usable for online play; (j) a lump sum of player tracking points or credits; (k) a multiplier for player tracking points or credits; (l) an increase in a membership or player tracking level; (m) coupons or promotions usable within and/or outside of the gaming establishment (e.g., a 20% off coupon for use at a convenience store); and/or (n) an access code usable to unlock content on the internet. It should be appreciated that, in certain embodiments, the award is an award that is not otherwise winnable during standard play of any primary games or any secondary games of the gaming system.

Another of the incentive types is an award the gaming system provides over an incentive period. In these embodiments, the incentive period during which the gaming system provides the award is a designated or variable quantity of plays of one or more wagering games, a designated or variable period of time, or any other suitable period. For example, in one embodiment, the incentive is an award of a multiplier that the gaming system provides for an incentive period of ten consecutive plays of the wagering game. Thus, in this example, when the termination causation event associated with that incentive occurs, the gaming system provides a multiplier for ten consecutive plays (or any suitable quantity of plays) of the wagering game.

Another of the incentive types is an opportunity to win an award (such as any of the awards listed above). In certain such embodiments, the gaming system provides the opportunity to win the award prior to, contemporaneous with, or shortly after the occurrence of the termination causation event. For example, the opportunity to win the award is a spin of an award wheel, and in this example the gaming system provides a spin of the award wheel when the termination causation event occurs. In other such embodiments, the gaming system provides the opportunity to win the award over an incentive period, such as one of the incentive periods described above. In these embodiments, when the triggering condition is satisfied during the incentive period, the gaming system provides the award. In various embodiments, the triggering event occurs when one or more of: (a) a total quantity of plays of one or more wagering games following the occurrence of the termination causation event reaches a designated quantity of plays; (b) a total amount wagered by the player during the gaming session following the occurrence of the termination causation event reaches a designated amount wagered; (c) a total amount of credits or currency won by the player during the gaming session following the occurrence of the termination causation event reaches a designated amount won; (d) a total amount of credits or currency lost by the player during the gaming session following the occurrence of the termination causation event reaches a designated amount lost; (e) a time of day following the occurrence of the termination causation event reaches a designated time of day; (f) a length of the gaming session following the occurrence of the termination causation event reaches a designated length of time; (g) the player has achieved a designated quantity of consecutive winning outcomes during the gaming session following the occurrence of the termination causation event; (h) the player has achieved a designated quantity of consecutive losing outcomes during the gaming session following the occurrence of the termination causation event; (i) the player has achieved a designated quantity of winning outcomes during the gaming session following the occurrence of the termination causation event; and (j) the player has achieved a designated quantity of losing outcomes during the gaming session following the occurrence of the termination causation event.

In certain embodiments, for a given player, the analytic engine component(s) determines the termination causation event(s) based on one or more of: (a) gaming session data collected and stored for one or more gaming sessions of that specific player, and (b) player identification and demographic data of that specific player, and not based on: (a) gaming session data collected and stored for gaming sessions of any other players, (b) termination causation events determined for any other players, or (c) player identification and demographic data of any other players. In one such embodiment, there are no termination causation events that may occur during an initial gaming session of a player, and thus the gaming system does not include any incentives available to be provided to the player during that initial gaming session. That is, since the player did not play any gaming sessions prior to the initial gaming session, the gaming system does not store any gaming session data usable to determine any termination causation events prior to that initial gaming session. In another such embodiment, the gaming system includes one or more default termination causation events that may occur during an initial gaming session of the player, and thus the gaming system includes one or more default incentives available to be provided to the player during that initial gaming session. It should be appreciated that the default termination causation events may be any suitable termination causation events (such as any of those described below) and may be determined in any suitable manner, such as based on: a player tracking status or ranking of the player, a bankroll of the player, a denomination of the EGM played by the player, an average bet amount of the player, player demographics, and/or one or more marketing segmentation factors (as further described below).

In an example of one of these embodiments, the gaming system periodically collects and stores data representing a credit balance of a player during a first gaming session. Since the first gaming session is the player's initial gaming session, the gaming system does not include any termination causation events for the player. In this example, there are no default termination causation events. The gaming system uses the gaming session data collected during the first gaming session to determine (in one manners described above) that the player will terminate a gaming session if the player's credit balance falls below a maximum wager amount. That is, the gaming system determines a termination causation event that occurs when the player's credit balance falls below the maximum wager amount. Accordingly, in association with a second subsequent gaming session, the gaming system provides the player an incentive (such as one free spin) if the player's credit balance falls below the maximum wager amount.

In other embodiments, for a given player, the analytic engine component(s) determines the termination causation event(s) based on one or more of: (a) gaming session data collected and stored for one or more gaming sessions of that specific player, and (b) player identification and demographic data of that specific player, and not based on: (a) gaming session data collected and stored for gaming sessions of any other players, (b) termination causation events determined for any other players, or (c) player identification and demographic data of any other players. In these embodiments, the analytic engine component(s) initially uses player demographics and/or market segmentation to determine which termination causation event(s) to initially implement for a given player. That is, in these embodiments, the termination causation event(s) initially employed by the gaming system for a player are determined based on the termination causation event(s) provided to players of a similar demographic (such as players of similar age, of the same gender, etc.) and/or players of a similar market segmentation (such as players having a similar bankroll, having a similar total amount wagered per gaming session, having a similar average amount wagered per game play, playing similar denomination gaming machines, having a similar player tracking ranking or status, playing the same types of games, etc.). As the gaming system collects and stores gaming session data for the player during the player's gaming sessions, the analytic engine component(s) weighs that stored data (that is associated with that specific player) more heavily than the data collected and stored in association with the gaming sessions of other players when determining which termination causation event(s) to employ for the player and/or whether to modify existing termination causation event(s) for one or more subsequent gaming sessions.

In an example of one of these embodiments, the gaming system periodically collects and stores data representing a credit balance of a player during a first gaming session. Since the first gaming session is the player's initial gaming session, the gaming system does not include any termination causation events for the player. Accordingly, in this example, the gaming system determines one or more termination causation events for the player based on market segmentation. In this example, the player is playing a $0.01 denomination gaming machine, and thus the gaming system initially employs a termination causation event employed by the gaming system for a majority of (or any suitable percentage of) other players of $0.01 denomination gaming machines. Specifically, the gaming system employs a termination causation event that occurs when the player's credit balance falls below a maximum wager amount. In this example, over time, the gaming system determines that the player frequently terminates the player's gaming sessions when the player's credit balance falls below twice the maximum wager amount. Accordingly, the gaming system modifies the termination causation event such that it occurs when the player's credit balance falls below twice the maximum wager amount. It should be appreciated that, in this example, the analytic engine component(s) tailors the termination causation event to the player's habits rather than the habits of other players as the gaming system collects gaming session data for that specific player.

In certain embodiments, for a given player, the analytic engine component(s) determines an incentive available to be provided to the player based on one or more of: (a) gaming session data collected and stored for one or more gaming sessions of that specific player, (b) termination causation events determined for that specific player, (c) player identification and demographic data of that specific player, and (d) the effectiveness of incentives previously provided to that specific player, and not based on: (a) gaming session data collected and stored for gaming sessions of any other players, (b) termination causation events determined for any other players, (c) player identification and demographic data of any other players, or (d) the effectiveness of incentives previously provided to any other players. In one of these embodiments, there are no incentives available to be provided to a player during an initial gaming session of the player, as explained above. In another one of these embodiments, the gaming system includes one or more default incentives available to be provided to the player during that initial gaming session. It should be appreciated that the default incentives may be any suitable incentives (such as any of those described above) and may be determined in any suitable manner, such as based on a player tracking status or ranking of the player, a bankroll of the player, a denomination of the EGM played by the player, an average bet amount of the player, player demographics, and/or one or more marketing segmentation factors (as further described below). Once the analytic engine component (s) determines an incentive available to be provided to the player, that incentive may be optimized over the course of future gaming sessions (as further described below).

In an example of one of these embodiments, the gaming system periodically collects and stores data representing a credit balance of a player during a first gaming session. Since the first gaming session is the player's initial gaming session, the gaming system does not include any termination causation events for the player. In this example, there are no default termination causation events or default incentives. The gaming system determines that the majority of games played by the player during the gaming session were spinning reel games. Accordingly, the gaming system determines an incentive of a quantity of free spins of one or more of the spinning reel games that is available to be provided to the player during a subsequent gaming session.

In other embodiments, for a given player, the analytic engine component(s) determines an incentive available to be provided to the player based on one or more of: (a) gaming session data collected and stored for one or more gaming sessions of that specific player, (b) termination causation events determined for one or more gaming sessions of that specific player, (c) player identification and demographic data of that specific player, and (d) the effectiveness of incentives previously provided to that specific player, and/or based on: (a) gaming session data collected and stored for gaming sessions of any other players, (b) termination causation events determined for gaming sessions of any other players, (c) player identification and demographic data of any other players, and/or (d) the effectiveness of incentives previously provided to any other players. That is, in these embodiments, for a given player, the analytic engine component(s) determines which incentive to provide to the player based on data collected for gaming sessions of that specific player and based on data collected for gaming sessions of one or more other players.

In such embodiments, the analytic engine component(s) initially uses player demographics and/or market segmentation to determine which initial incentive(s) to provide to a player. That is, in these embodiments, the incentive(s) initially provided to a player are determined based on the incentive(s) (and the effectiveness of that incentive(s)) provided to players of a similar demographic (such as players of similar age, of the same gender, etc.) and/or players of a similar market segmentation (such as players having a similar bankroll, having a similar total amount wagered per gaming session, having a similar average amount wagered per game play, playing similar denomination gaming machines, having a similar player tracking ranking or status, playing the same types of games, etc.). As the gaming system collects data for a player during the player's gaming sessions, the analytic engine component(s) weighs that collected data associated with the player more heavily than the data collected from the gaming sessions of other players when determining which incentives to provide to the player (as discussed above). For example, initially, the gaming system provides a first player with an incentive of five free spins, which is the same incentive that the gaming system provides to players of a similar demographic and market segmentation as the first player. Over time, however, the gaming system determines that the incentive of five free spins does not cause the player to delay expected termination of a gaming session. Thus, the gaming system modifies the incentive such that it amounts to ten free spins (or any suitable quantity of free spins), which does cause the player to delay expected termination of a gaming session.

FIGS. 2A, 2B, 2C, and 2D illustrate screen shots of an example embodiment of the gaming system of the present disclosure. In this example, the gaming system is configured to operate a spinning reel-type wagering game upon a wager by a player, though it should be appreciated that the gaming system may be configured to operate any suitable game or games. In this example, the gaming system includes a display device 120 that displays the wagering game. The wagering game includes a plurality of symbol display areas 130*a*, 130*b*, 130*c*, 130*d*, 130*e*, 130*f*, 130*g*, 130*h*, 130*i*, 130*j*, 130*k*, 130*l*, 130*m*, 130*n*, and 130*o*, each of which is configured to display one of a plurality of symbols.

Display device 120 displays a plurality of paylines for the wagering game, each of which is associated with a different plurality of the symbol display areas. Specifically, payline A 132*a* is associated with symbol display areas 130*a*, 130*b*, 130*c*, 130*d*, and 130*e*; payline B 132*b* is associated with symbol display areas 130*a*, 130*b*, 130*h*, 130*n*, and 130*o*; payline C 132*c* is associated with symbol display areas 130*f*, 130*g*, 130*h*, 130*i*, and 130*j*; payline D 132*d* is associated with symbol display areas 130*k*, 130*l*, 130*h*, 130*d*, and 130*e*; and payline E 132*e* is associated with symbol display areas 130*k*, 130*l*, 130*m*, 130*n*, and 130*o*. Payline A 132*a*, payline B 132*b*, payline C 132*c*, payline D 132*d*, and payline E 132*e* are sometimes referred to herein as paylines A, B, C, D, and E.

Display device 120 displays a paytable 122 for the wagering game that includes a plurality of winning symbol combinations. Paytable 122 indicates the credit payout associated with each respective winning symbol combination. In this example, paytable 122 indicates the credit payout associated with each respective winning symbol combination when the maximum wager, which is 50 credits in this example (but could be any suitable amount), is placed by the player for a play of the wagering game. More specifically, winning symbol combination SEVEN-SEVEN-SEVEN-SEVEN-SEVEN is associated with an award of 10,000 credits; winning symbol combination DIAMOND-DIAMOND-DIAMOND-DIAMOND is associated with an award of 7,500 credits, winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; winning symbol combination TRIPLE CHERRY-TRIPLE CHERRY-TRIPLE CHERRY is associated with an award of 250 credits; winning symbol combination BAR-BAR-BAR is associated with an award of 100 credits; and winning symbol combination CHERRY-CHERRY-CHERRY is associated with an award of 25 credits.

It should be appreciated that, in various embodiments: (a) the wagering game may include, and the display device may display, any suitable quantity of symbol display areas in any suitable configuration or arrangement; (b) the wagering game may include, and the display device may display, any suitable quantity of paylines for the wagering game; (c) each of the displayed paylines may be associated with any suitable quantity of the symbol display areas and any suitable combination of the symbol display areas; (d) the gaming system may use any other suitable award determination other than a payline evaluation, such as a ways to win and/or a scatter pay award determination (as described above); (e) the paytable may be modified to reflect lower credit payouts when a wager that is less than the maximum wager is placed on a play of the wagering game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; and (j) any suitable symbols may be employed and may include, for example, any suitable markings or indicia such as letters, numbers, or illustrations or pictures of objects.

Display device 120 displays an indication, notification, or message display area 121, which displays information, notifications, and/or messages before, during, or after play of the wagering game; a credit meter 124, which displays the player's credit balance; a wager indicator or display 126, which displays any wager placed by the player for a play of the wagering game; and an award indicator or display 128, which displays any award a player has won during a play of the wagering game.

In this example, a player is in the middle of a gaming session (i.e., has initiated but has not terminated the gaming session). Prior to initiation of the current gaming session, the gaming system determined a termination causation event associated with the player based on: (a) player information and demographic data of the player, (b) individual gaming session data collected from prior gaming sessions of the player, and (c) cumulative gaming session data of the player. Specifically, based on such data, the gaming system determined a termination causation event that occurs when the player wins the top award, which is the 10,000 credit award for the SEVEN-SEVEN-SEVEN-SEVEN-SEVEN winning symbol combination in this example. Thus, when the player wins the top award (i.e., when the termination causation event occurs), the gaming system provides the player with an incentive in an attempt to cause the player to continue the player's gaming session. In this example, the incentive is a multiplier applicable for the next ten plays of the wagering game of the gaming session.

Figure 2A:
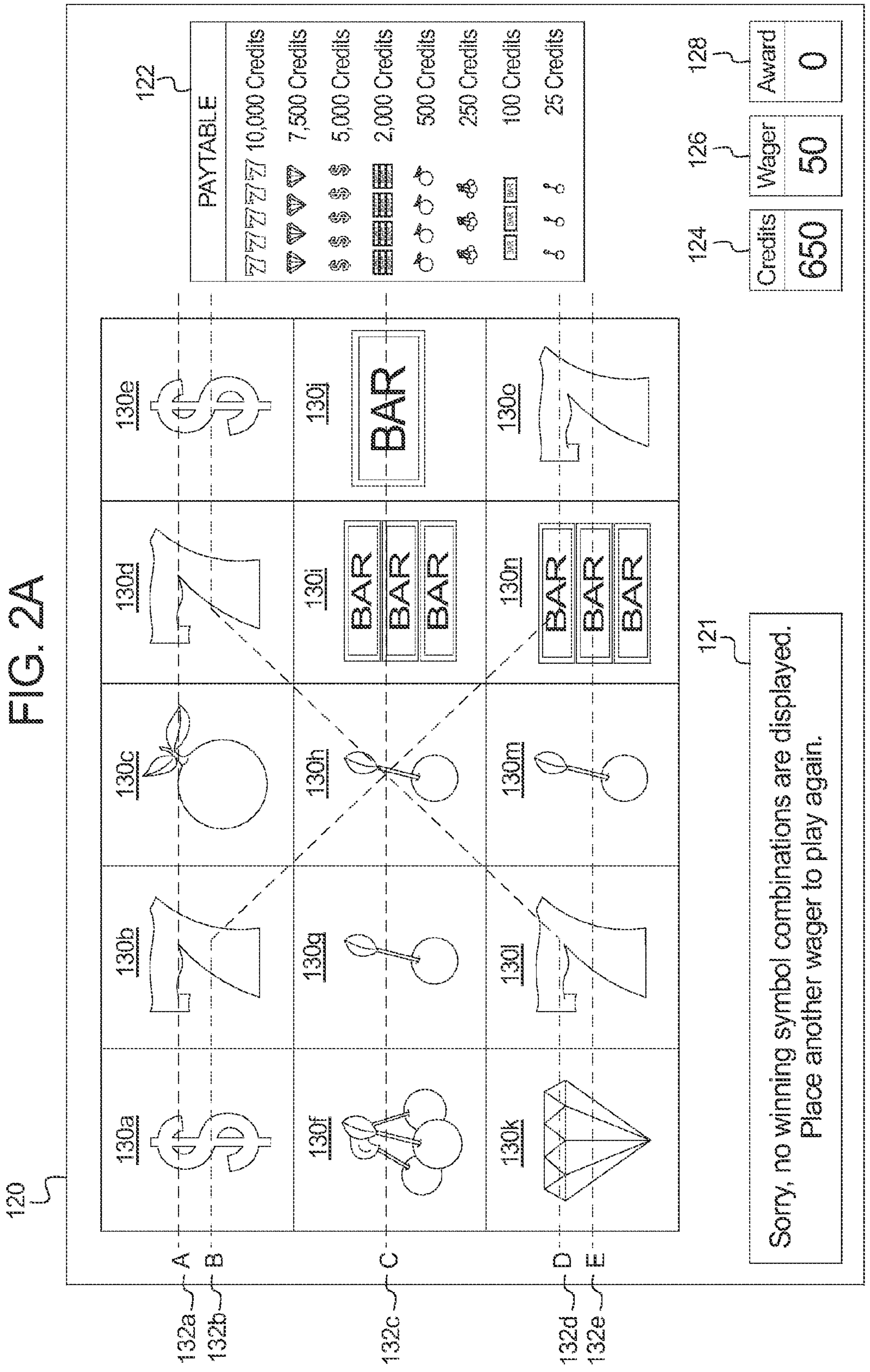
FIGS. 2A, 2B, 2C, and 2D are front views of a display device of one embodiment of the gaming system of the present disclosure, and illustrate an example play of a wagering game in which the gaming system provides a player an incentive in response to a termination causation event occurring.

FIG. 2A illustrates a screen shot of display device 120 after a play of the wagering game during the player's current gaming session. At this point in the gaming session, the player has 650 credits, which are indicated in credit meter 124. Message display area 121 displays a message that notifies the player that no winning symbol combinations are displayed, and invites a player to place another wager on one or more of the paylines for a play of the wagering game.

Figure 2B:
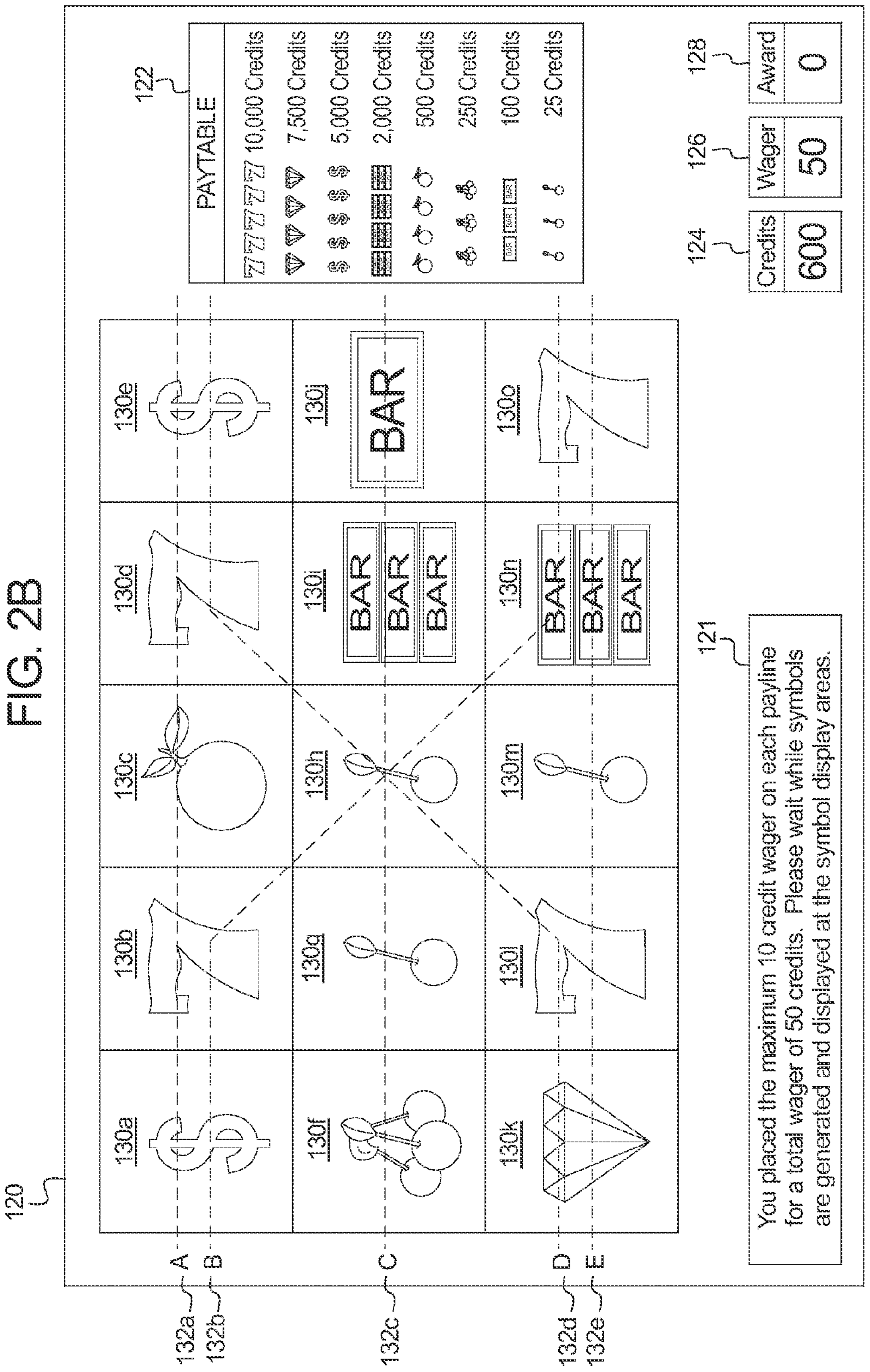

As illustrated in FIG. 2B, the player places the maximum wager of 50 credits (i.e., 10 credits on each of paylines A, B, C, D, and E in this example), which initiated a play of the wagering game. The player's wager of 50 credits is indicated by wager indicator 126. The player's total remaining credit balance of 600 credits (i.e., the player's previous credit balance of 650 credits minus the player's wager of 50 credits) is indicated by credit meter 124.

Figure 2C:
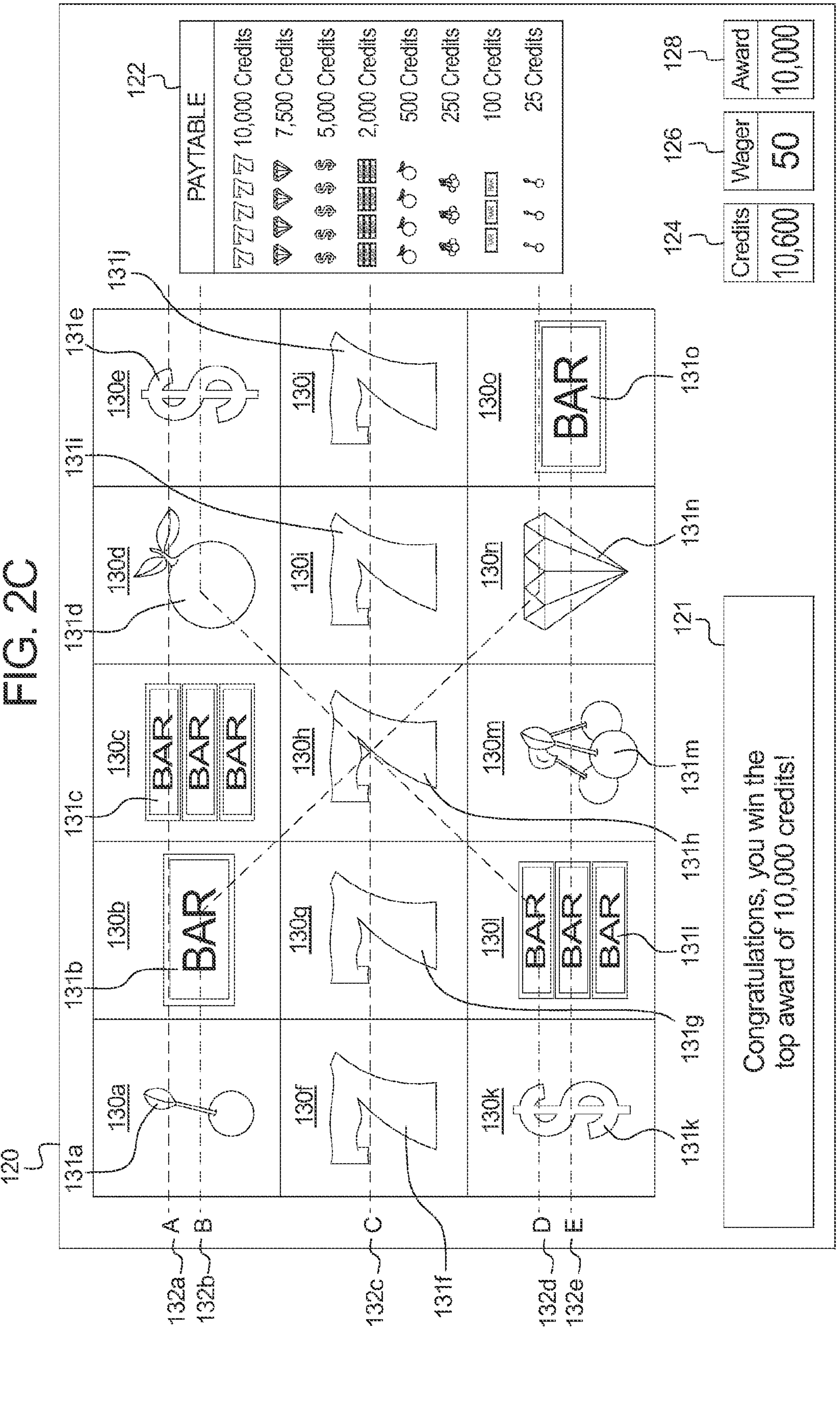

As illustrated in FIG. 2C, the gaming system generates and displays one of the symbols at each of the symbol display areas for the wagered-on play of the wagering game. Specifically, the gaming system generated and displayed: symbol 131*a* at symbol display area 130*a*, symbol 131*b* at symbol display area 130*b*, symbol 131*c* at symbol display area 130*c*, symbol 131*d* at symbol display area 130*d*, symbol 131*e* at symbol display area 130*e*, symbol 131*f* at symbol display area 130*f*, symbol 131*g* at symbol display area 130G, symbol 131*h* at symbol display area 130*h*, symbol 131*i* at symbol display area 130*i*, symbol 131*j* at symbol display area 130*j*, symbol 131*k* at symbol display area 130*k*, symbol 131*l* at symbol display area 130*l*, symbol 131*m* at symbol display area 130*m*, symbol 131*n* at symbol display area 130*n*, symbol 1310 at symbol display area 130*o*.

After generating and displaying one of the symbols at each of the symbol display areas, the gaming system makes an award determination based on the displayed symbols. That is, the gaming system determines whether the displayed symbols form any of the winning symbol combinations included in paytable 122 along wagered-on paylines A, B, C, D, and/or E. As indicated by the message displayed in message display area 121, in this example the player wins the top award of 10,000 credits for the SEVEN-SEVEN-SEVEN-SEVEN-SEVEN winning symbol combination formed by SEVEN symbol 131*f*, SEVEN symbol 131*g*, SEVEN symbol 131*h*, SEVEN symbol 131*i*, and SEVEN symbol 131*j* displayed from left to right along payline C. The player's 10,000 credit award is indicated by award indicator 128, and the credit meter indicates the player's new credit balance of 10,600 credits (i.e., the player's previous credit balance of 600 credits plus the player's award of 10,000 credits.

Figure 2D:
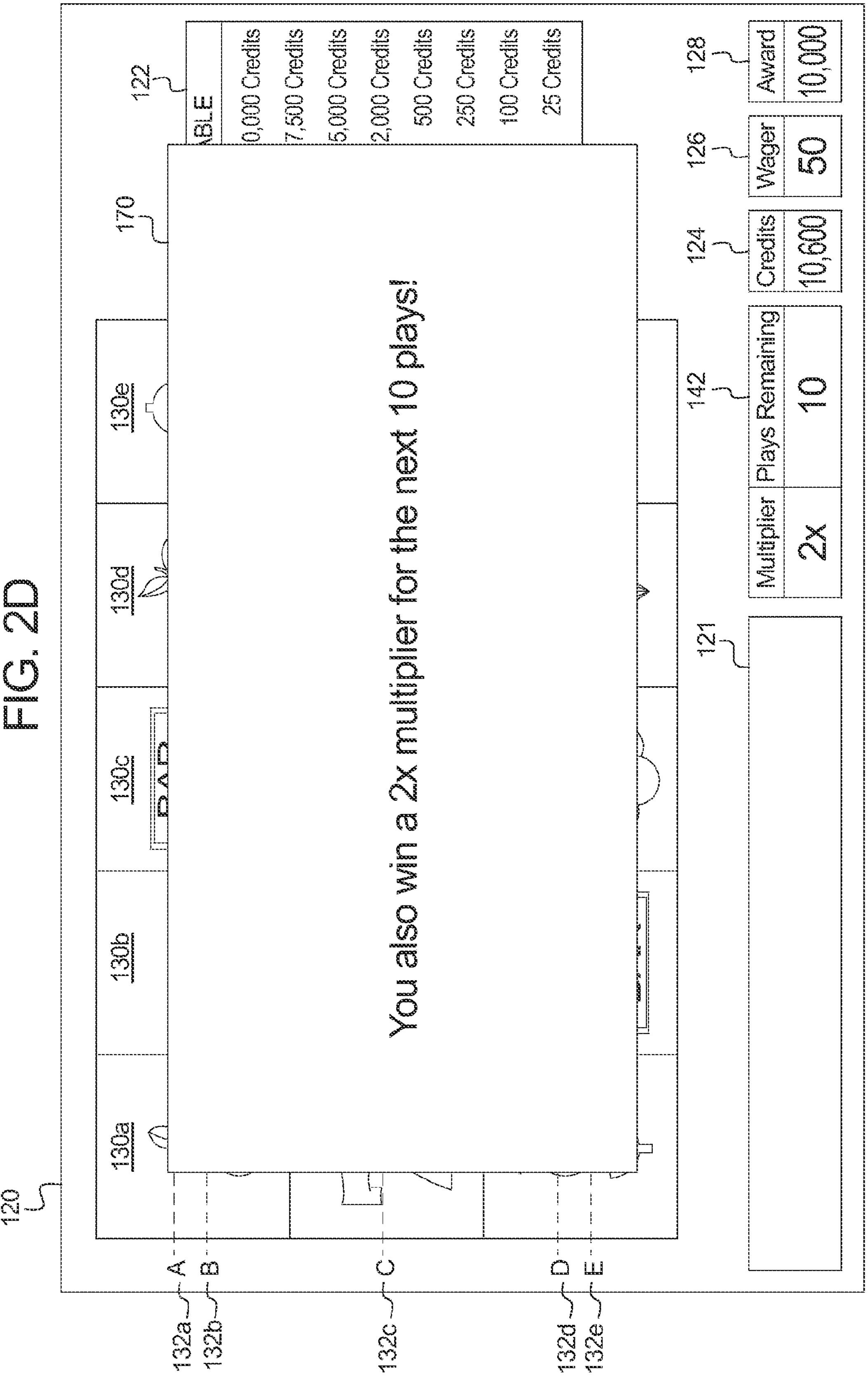

The gaming system determines whether the termination causation event occurred. In this example, since the player won the top award, the termination causation event occurred. Thus, the gaming system provides the player the incentive in an attempt to cause the player to continue the player's gaming session rather than terminate the player's gaming session. As illustrated in FIG. 2D, in this example the gaming system displays the incentive to the player by way of notification window 170. The message displayed in notification window 170 indicates that the player has been awarded a 2× multiplier for the next ten plays of the wagering game. Multiplier display 142 indicates the value of the multiplier (2× in this example) and the quantity of plays remaining to which the multiplier will be applied.

In various embodiments: (a) a plurality of central servers, central controllers, or remote hosts co-act as the player identification and data collection component and the analytic engine component(s); (b) different central servers, central controllers, or remote hosts act as the player identification and data collection component and the analytic engine component(s); (c) an EGM acts as both the player identification and data collection component and the analytic engine component(s); (d) a plurality of EGMs co-act as the player identification and data collection component and the analytic engine component(s); (e) different EGMs act as the player identification and data collection component and the analytic engine components; (f) one or more EGMs co-act with one or more central servers, central controllers, or remote hosts to co-act as the player identification and data collection component and the analytic engine component(s); and/or (g) an EGM and a central server, central controller, or remote host separately act as the player identification and data collection component and the analytic engine component(s).

It should be appreciated that, in certain embodiments, the player identification and data collection component collects and stores the individual gaming session data in any of a variety of manners. In one embodiment in which the gaming system includes an EGM and a central server, central controller, or remote host acting as the player identification and data collection component, the player identification and data collection component polls the EGM at which a player is playing at predetermined intervals during the player's gaming session (such as every second, every five seconds, every ten seconds, or every minute). When the EGM is polled, the EGM transmits individual gaming session data for the player playing the EGM to the player identification and data collection component, which stores that data in the database. In another such embodiment, the EGM is configured to transmit individual gaming session data of the player playing the EGM to the player identification and data collection component at predetermined time intervals during the player's gaming session (such as every second, every five seconds, every ten seconds, or every minute). The player identification and data collection component stores the transmitted data in the database. In another such embodiment, the EGM is configured to transmit individual gaming session data of the player playing the EGM to the player identification and data collection component upon termination of the player's gaming session.

In certain embodiments in which the gaming system includes an EGM and a central server, central controller, or remote host acting as the player identification and data collection component, the player identification and data collection component is separate from and in addition to any central server, central controller, or remote host that is configured to control or monitor game play on the EGM. In other such embodiments, the player identification and data collection component is separate from and in addition to any player tracking system or component employed by the gaming system. In further such embodiments, the player identification and data collection component is part of a player tracking system or component of the gaming system. In another such embodiment, the player identification and data collection component is part of a central server, central controller, or remote host that is configured to control or monitor game play on the EGM.

In various embodiments, for a given player, the player identification and demographic data represents one or more of the following: (a) the player's account number, (b) the player's player card number, (c) the player's first name, (d) the player's surname, (e) the player's preferred name (such as a nickname), (f) the player's player tracking ranking, (g) any promotion status associated with the player's player tracking card or ranking, (h) the player's address, (i) the player's birthday, (j) the player's anniversary, (k) the player's income, (l) the player's marital status, (m) the player's occupation, (n) the player's sex, (o) the player's ethnicity, (p) the player's country of origin, and (q) any other suitable information.

In certain embodiments, for a gaming session of a player, the player identification and data collection component collects and stores individual gaming session data representing one or more of the following: (a) an instantaneous length of time of the gaming session (i.e., a length of time beginning at the time of day at which the gaming session was initiated and ending at the time of measurement); (b) an instantaneous quantity of plays of wagering games played by the player during the gaming session (i.e., a quantity of plays of wagering games played beginning at the initiation of the gaming session and ending at the time of measurement); (c) each amount wagered by the player for any plays of any wagering games played by the player during the gaming session; (d) an average amount wagered by the player for any plays of any wagering games played by the player during the gaming session; (e) an instantaneous cumulative amount wagered by the player for any plays of any wagering games played by the player during the gaming session (i.e., a cumulative amount wagered from the initiation of the gaming session to the time of measurement); (f) a time (such as a time of day or a time relative to the initiation of the gaming session) at which one or more wagers were placed for any plays of any wagering games played by the player during the gaming session; (g) one or more outcomes of any plays of any wagering games played by the player during the gaming session; (h) a quantity of plays of any secondary or bonus games played by the player during the gaming session; (i) an instantaneous frequency of plays of any wagering games played by the player during the gaming session (i.e., a frequency at which the player plays any wagering games during the time period beginning with the initiation of the gaming session and ending at the time of measurement); (j) a quantity of instances in which the player has deposited currency or credit to the gaming system; (k) a change in frequency of play of any wagering games played by the player during the gaming session; (l) an instantaneous credit balance; (m) a change in an amount bet by the player on any plays of any wagering games over a designated period of time or a designated quantity of plays, and (n) any other suitable information.

In various embodiments, for a gaming session of a player, the player identification and data collection component collects and stores individual gaming session termination data representing one or more of the following: (a) an outcome of a final play of a wagering game played by the player prior to termination of the gaming session; (b) a time of day at which the gaming session was terminated; (c) a total quantity of plays of any wagering games played by the player during the gaming session; (d) a total amount of credits or currency won by the player during the gaming session; (e) a total amount of credits or currency lost by the player during the gaming session; (f) a quantity of consecutive winning outcomes achieved by the player during the gaming session immediately prior to termination of the gaming session (i.e., length of a winning streak prior to termination); (g) a quantity of consecutive losing outcomes achieved by the player during the gaming session immediately prior to termination of the gaming session (i.e., length of a losing streak prior to termination); (h) a total quantity of winning outcomes achieved by the player during the gaming session; (i) a total quantity of losing outcomes achieved by the player during the gaming session; (j) a total amount of coin-in during the gaming session; (k) the player's credit balance upon termination of the gaming session; and (l) any other suitable information associated with the termination of the gaming session.

In certain embodiments, for a given player, the cumulative gaming session data represents one or more of: (a) a total quantity of plays of any wagering games played by the player across all gaming sessions; (b) a total amount wagered by the player on any plays of any wagering games played by the player across all gaming sessions; (c) a total amount of credits or currency won by the player across all gaming sessions; (d) a total amount of credits or currency lost by the player across all gaming sessions; (e) a total length of time of all gaming sessions; (f) a total quantity of coin-in across all gaming sessions; (g) a total quantity of coin-in across all gaming sessions; (h) a total quantity of plays of secondary or bonus games provided to the player across all gaming sessions; (i) a total quantity of winning outcomes achieved by the player across all gaming sessions; (j) a total quantity of losing outcomes achieved by the player across all gaming sessions; (k) a total quantity of currency deposited by the player across all gaming sessions; (l) a change in an amount bet by the player on any plays of any wagering games over a designated period of time or a designated quantity of plays; and (m) any other suitable information associated with one or more gaming sessions.

In certain embodiments, for a given player, the cumulative gaming session termination data represents one or more of the following: (a) an average quantity of plays of wagering games per gaming session; (b) an average amount wagered per gaming session; (c) an average amount of credits or currency won per gaming session; (d) an average amount of credits or currency lost per gaming session; (e) an average quantity of consecutive winning outcomes per gaming session; (f) an average quantity of consecutive losing outcomes per gaming session; (g) an average time of day at which a gaming session is terminated; (h) an average quantity of winning outcomes per gaming session; (i) an average quantity of losing outcomes per gaming session; (j) a frequency of gaming sessions during a designated time period, such as per day, per week, per month, or per year; (k) a frequency that the player terminated a gaming session subsequent to one or more designated events; (l) an average quantity of coin-in per gaming session; (m) an average amount deposited per gaming session; (n) an average credit balance upon termination of a gaming session; (o) an average credit balance of the player upon termination of the gaming session; and (p) any other suitable information associated with the termination of the gaming sessions.

In various embodiments, for a given player, each termination causation event occurs during a gaming session of the player when one or more of: (a) the player receives a jackpot award, progressive award, or other designated award during the gaming session; (b) a total quantity of plays of wagering games played by the player during the gaming session reaches a designated quantity of plays; (c) the player deposits currency or credits to fund the gaming system at least a designated quantity of times during the gaming session; (d) a total amount wagered by the player during the gaming session reaches a designated amount wagered; (e) a total amount of credits or currency won by the player during the gaming session reaches a designated amount won; (f) a total amount of credits or currency lost by the player during the gaming session reaches a designated amount lost; (g) a time of day reaches a designated time of day; (h) a length of the gaming session reaches a designated length of time; (i) a play of a secondary or bonus game has not been provided within a designated amount of time during the gaming session; (j) a play of a secondary or bonus game has not been provided within a designated quantity of plays of wagering games during the gaming session; (k) the player achieves a designated quantity of consecutive winning outcomes during the gaming session; (l) one or more designated events occur; (m) the player has achieved a designated quantity of consecutive losing outcomes during the gaming session; (n) a total quantity of winning outcomes achieved by the player during the gaming session reaches a designated quantity; (o) a total quantity of losing outcomes achieved by the player during the gaming session reaches a designated quantity; (p) a total quantity of coin-in during the gaming session reaches a designated quantity; (q) a credit balance of the player reaches a designated credit balance; (r) a total amount of currency deposited by the player during the gaming session reaches a designated amount; (s) a change in frequency of play reaches a designated amount; (t) a ticket, coupon, or promotion is inserted or otherwise entered (such as by typing in a promotion code or scanning a barcode); (u) a designated quantity of credits is transferred onto the gaming system; (v) player tracking points are converted into one or more credits; (w) merchandise is purchased on the gaming system (such as through the use of player tracking points); (x) a contribution is made to charity through the use of the gaming system; (y) an update is posted onto a social networking website; (z) a status is changed on a social networking website; (aa) a gaming establishment (such as a casino) is liked or shared via a social networking website; (bb) a specific winning symbol, winning symbol combination, or other outcome is achieved; (cc) a picture is submitted; (dd) an email address is supplied; and (ee) a survey is completed.

In certain embodiments, for a given player, the incentives available to be provided to that player have values that are at least a minimum value and at most a maximum value. It should be appreciated that these minimum and maximum values may be set based on any suitable factor, such as player bankroll (e.g., players having higher bankrolls are provided incentives having relatively higher incentive values), player tracking status (e.g., players having higher player tracking rankings or statuses are provided incentives having relatively higher incentive values), and gaming machine denomination (e.g., players playing higher denomination gaming machines are provided incentives having relatively higher incentive values). It should be appreciated that in certain of these embodiments the gaming system does not provide incentives having incentive values higher than the maximum value to the player, even if the incentives having the maximum value are not optimized or effective. In certain of these embodiments, the maximum value is a predetermined value beyond which the gaming system becomes unprofitable for the gaming establishment.

In one embodiment, the gaming system provides incentives to a player until a quantity of incentives provided to the player reaches a designated quantity, after which the gaming system does not provide any additional incentives to the player until one or more reset conditions are satisfied. In one such embodiment, the gaming system provides incentives to a player during a gaming session until a quantity of incentives provided to the player during that gaming session reaches the designated quantity. In another such embodiment, the gaming system provides incentives to a player over a plurality of gaming sessions until a quantity of incentives provided to the player during those gaming session reaches the designated quantity. It should be appreciated that the reset condition may be any suitable condition. For example, the reset condition is satisfied after a predetermined length of time has elapsed or after a predetermined quantity of plays of one or more wagering games has occurred.

In various embodiments, an incentive available to be provided to a player during a gaming session is static or non-changeable once the gaming session is initiated. That is, in these embodiments, the analytic engine component(s) does not modify the incentive available to be provided to the player during that gaming session. In other embodiments, an incentive available to be provided to a player during a gaming session is variable or modifiable during play of the gaming session. In these embodiments, for a given gaming session, the analytic engine component(s) may modify an incentive available to be provided during that gaming session based on individual gaming session data being collected and stored by the player identification and data collection component for a player of that gaming session and/or based on data collected and stored for gaming sessions of other players (such as players of a similar demographic or market segmentation). That is, in these embodiments, the analytic engine component (s) may modify the incentive available to be provided to the player in real time to reflect the play of the current gaming session (and/or other co-pending gaming sessions of other players). For example, in one embodiment, the analytic engine component(s) may double an incentive period provided to the player during the gaming session during which a multiplier is active if the player wagers at least a designated quantity of credits during the originally provided incentive period. In one embodiment, the analytic engine component(s) modify the incentive available to be provided to the player by one or more of: (a) increasing a value of the incentive, (b) decreasing a value of the incentive, (c) increasing an incentive period, (d) decreasing an incentive period, and (e) chancing the incentive type of the incentive.

It should be appreciated that the gaming system may cause any of the termination causation events or any of the incentives to be displayed to the player. For example, the gaming system causes the incentive period to be displayed to the player. In another example, the gaming system causes the incentive itself to be displayed to the player. In a further example, the gaming system causes an award associated with the incentive to be displayed to the player. In one example, the gaming system causes one or more termination causation events that have not occurred to be displayed to the player. It should also be appreciated that the gaming system may cause any suitable display device, such as an EGM display, an EGM top glass, a player tracking display, or an overhead display, to display such indications. It should further be appreciated that any such indications may additionally or alternatively be made via audio speaker, animatronics, orchestration, lighting effects, or any other suitable effects.

In certain embodiments, one or more incentives are funded using a gaming establishment's marketing dollars or marketing account. In other embodiments, such awards are funded using a hidden progressive. That is, in these embodiments, a portion of each wager is allocated to a hidden progressive award pool, and prior to, contemporaneously with, or shortly after a designated number of the termination causation events occur, the hidden progressive award pool is used to fund the incentive associated with the termination causation event.

Optimization of Incentives

In certain embodiments, the gaming system and, more particularly, the analytic engine component(s) of the gaming system, optimizes an incentive available to be provided to a player based on the effectiveness of one or more previously provided incentives by iteratively modifying the incentive type and/or the value of that incentive available to be provided to the player. It should be appreciated that the effectiveness of an incentive may be determined in any suitable manner. In one embodiment, the analytic engine component(s) determines the effectiveness of an incentive provided to a player during a gaming session based on whether that provided incentive was successful or unsuccessful at causing the player to delay expected termination of that gaming session for at least a designated period of time or a designated quantity of plays of one or more games. For example, an incentive that, when provided to a player during a gaming session, causes the player to delay expected termination of that gaming session for at least five minutes is successful, and an incentive that, when provided to a player during a gaming session, causes the player to delay expected termination of that gaming session for less than five minutes is unsuccessful.

In another embodiment, the gaming system determines the effectiveness of an incentive provided to a player during a gaming session based on the length of the period of time between the gaming system's providing of that incentive and the player's eventual termination of that gaming session relative to that of other previously provided incentives. For example, an incentive provided to a player during a gaming session that causes the player to delay expected termination of that gaming session for one minute is less effective than an incentive provided to a player during a gaming session that causes the player to delay expected termination of that gaming session for ten minutes. In another embodiment, the gaming system determines the effectiveness of an incentive provided to a player during a gaming session based on the quantity of plays between the gaming system's providing of that incentive and the player's eventual termination of that gaming session. For example, an incentive provided to a player during a gaming session that causes the player to delay expected termination of that gaming session for five additional plays of a game is less effective than an incentive provided to a player during a gaming session that causes the player to delay expected termination of that gaming session for twenty-five additional plays of a game.

In certain embodiments, the analytic engine component(s) determines that an incentive is optimized when that incentive is effective at causing a player to delay expected termination of the gaming session during which the gaming system provided that incentive. In these embodiments, for an incentive available to be provided to a given player, the analytic engine component(s) determines, after that incentive has been provided to the player during a gaming session, whether that incentive effectively caused the player to delay expected termination of that gaming session. In these embodiments, if the analytic engine component(s) determines that that incentive was effective, the analytic engine component(s) considers that incentive optimized. If the analytic engine component(s) determines that that incentive was not effective, the analytic engine component(s) considers that incentive not to be optimized and attempts to optimize that incentive. To attempt to optimize that incentive (i.e., in this embodiment, render it effective), the gaming system modifies: (a) the incentive type of that incentive, (b) the value of that incentive, or (c) both the incentive type and the value of that incentive. When that modified incentive is provided to the player in a subsequent gaming session, the analytic engine component(s) again determines whether that modified incentive effectively caused the player to delay expected termination of that subsequent gaming session. If that modified incentive was effective, the analytic engine component(s) considers that modified incentive optimized and does not modify that modified incentive. If that modified incentive was not effective, the analytic engine component(s) considers that incentive not to be optimized and again modifies that modified incentive to attempt to optimize that incentive (i.e., in this embodiment, render it effective). The analytic engine component(s) repeats this process until that modified incentive is optimized (i.e., in this embodiment, becomes effective). For example, if a player's credit balance falls below a maximum wager amount, the analytic engine component(s) provides the player an incentive of one free spin. If, during a gaming session, the player's credit balance falls below the maximum wager amount, the analytic engine component(s) provides the player the incentive of one free spin, and the player nevertheless terminates the gaming session, the gaming system determines that that incentive did not effectively cause the player to delay expected termination of that gaming session, and is therefore not optimized. Based on this information, the analytic engine component(s) modifies the previously unsuccessful incentive such that the incentive is two free spins rather than one free spin. In other words, the analytic engine component(s) increased the value of that incentive to attempt to optimize that incentive.

In another embodiment, the analytic engine component(s) determines that an incentive is optimized when: (a) that incentive is effective, and (b) the incentive value of that incentive is minimized to a minimum effective value. In this embodiment, when the analytic engine component(s) determines that an incentive is effective but not yet optimized, the analytic engine component(s) iteratively reduces the value of that incentive to determine the minimum effective value of that incentive for which that incentive is still effective. At this point, the analytic engine component(s) considers that incentive to be optimized. For example, the gaming system includes an incentive of five free spins (i.e., an incentive type of free spins and a value of five). When that incentive is provided to a player during a gaming session, that incentive is effective at causing the player to delay expected termination of that gaming session. However, that incentive is not yet optimized because the analytic engine component(s) has not yet determined whether the value of that incentive (i.e., five in this example) is the minimum effective value. Accordingly, the analytic engine component(s) reduces the value of that incentive to four. During a subsequent gaming session, that modified incentive is again provided to the player, and in this instance is not effective in causing the player to delay expected termination of the subsequent gaming session. Thus, the analytic engine component determines that a value of five is the minimum effective value of that incentive, modifies that incentive such that it has a value of five, and considers that incentive to be optimized.

In certain embodiments, after the analytic engine component(s) determines that an incentive provided to a player during a gaming session is not optimized, the analytic engine component(s) modifies that provided incentive based, at least in part, on the effectiveness of other similar incentives previously provided to the player and/or on whether those other similar incentives are optimized. That is, the analytic engine component(s) determines whether to modify: (a) the incentive type of that incentive, (b) the value of that incentive, or (c) both the incentive type and the value of that incentive based on the effectiveness of other previously provided incentives and/or on whether those other similar incentives are optimized. For example, the gaming system includes four incentives: a first incentive of ten free spins (i.e., an incentive type of free spins and a value of ten); a second incentive of a 2× multiplier (i.e., an incentive type of multiplier and a value of two); a third incentive of a 3× multiplier (i.e., an incentive type of multiplier and a value of three); and a fourth incentive of a 5× multiplier (i.e., an incentive type of multiplier and a value of five). In this example, each of the second incentive, the third incentive, and the fourth incentive were previously provided to the player, and each was effective at causing the player to delay expected termination of the gaming session during which the gaming system provided that incentive. Subsequently, the analytic engine component(s) provides the player with the first incentive during a gaming session, and determines that the first incentive was ineffective at causing the player to delay expected termination of that gaming session. The analytic engine component(s) determines that each of the second, third, and fourth incentives were effective regardless of the value of those incentives, and determines that the incentives having the multiplier incentive type are effective at causing the player to delay expected termination of a gaming session regardless of their values. Accordingly, the gaming system modifies the incentive type of the first incentive to the multiplier incentive type such that the first incentive is a 10× multiplier (i.e., an incentive type of multiplier and a value of ten).

In one example, once the gaming system determines an optimal incentive type, the gaming system determines an optimal incentive value such that at least a designated additional coin-in is, on average, provided by a player after that incentive is provided to the player. For instance, Table 2 below lists the average additional coin-in provided by a player after the player is provided the corresponding incentive following the occurrence of a jackpot award having an amount of $200 to $250.

TABLE 2

| Example Average Additional Coin-In for Corresponding Incentive Amount | | |
|---|---|---|
| Jackpot Award Amount | Incentive Value | Average Additional Coin-In |
| $200-250 | $5 | $ 7.42 |
| $200-250 | $10 | $14.29 |
| $200-250 | $15 | $21.03 |
| $200-250 | $20 | $22.02 |
| $200-250 | $25 | $23.12 |

In this instance, the gaming system determines that the optimal incentive value is $15 because it is the minimum incentive value associated with an average additional coin-in of at least $20.

In certain embodiments, for a given player, the analytic engine component(s) optimizes an incentive available to be provided to that player based on the effectiveness of incentives previously provided to only that specific player, and not based the effectiveness of incentives previously provided to any other players. In other embodiments, for a given player, the analytic engine component(s) optimizes an incentive available to be provided to that player based on the effectiveness of incentives previously provided to that player and/or based on incentives previously provided to other players. For example, when the analytic engine component(s) determines that an incentive provided to a given player is not optimized, the analytic engine component(s) determines how to modify that incentive based on the effectiveness of similar incentives previously provided to players of similar demographics and/or market segmentation of the player (as described above).

In one embodiment, once the analytic engine component(s) optimizes the incentive value of an incentive, the analytic engine component(s) periodically rotates the incentive type of that optimized incentive (such as each time that incentive is provided to the player). This enables the gaming system to keep the incentives appearing "fresh" from the player's perspective without increasing the value of the incentive from the gaming establishment's perspective (i.e., the cost to the gaming establishment or other incentive provider remains the same).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to below as an "EGM." Additionally, for brevity and clarity, unless specifically stated otherwise, "EGM" as used below represents one EGM or a plurality of EGMs, and "central server, central controller, or remote host" as used below represents one central server, central controller, or remote host or a plurality of central servers, central controllers, or remote hosts.

Figure 3A:
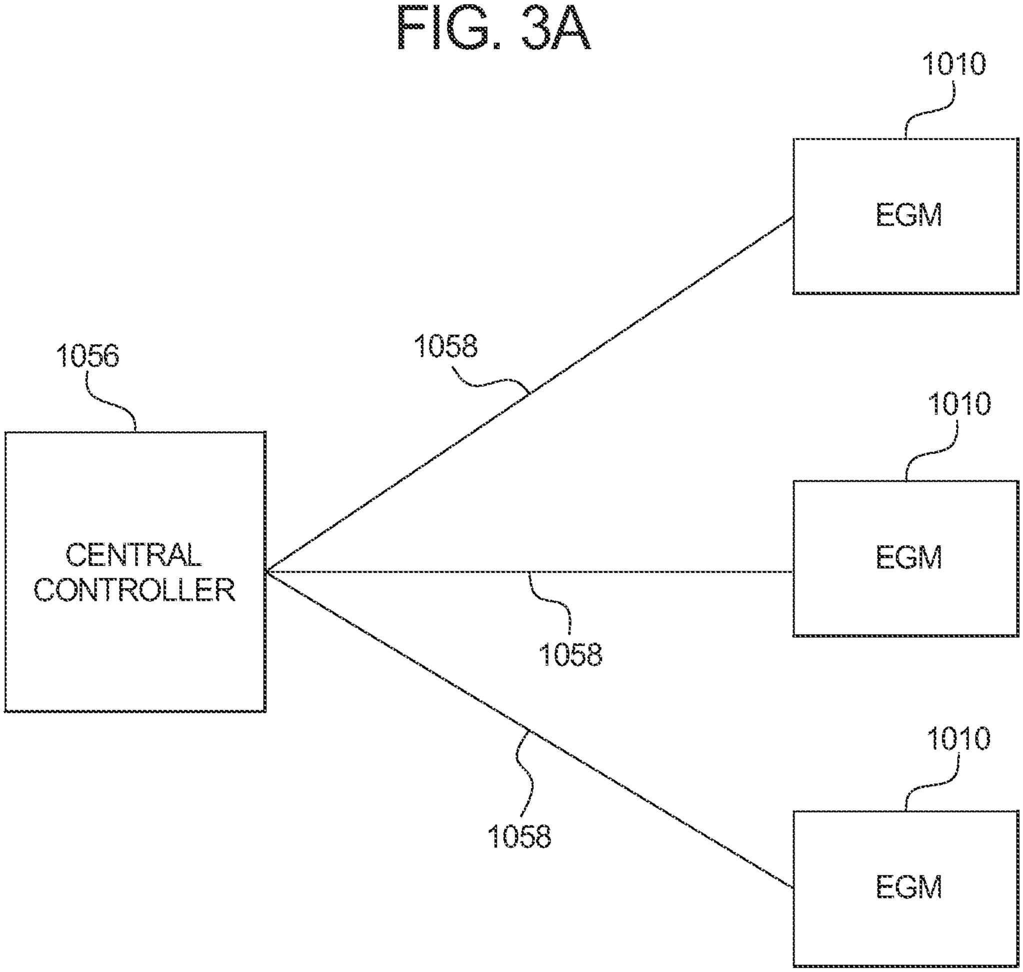
FIG. 3A is a schematic block diagram of one embodiment of the gaming system of the present disclosure including a central server, central controller, or remote host configured to communicate with a plurality of EGMs over a data network or remote communications link.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
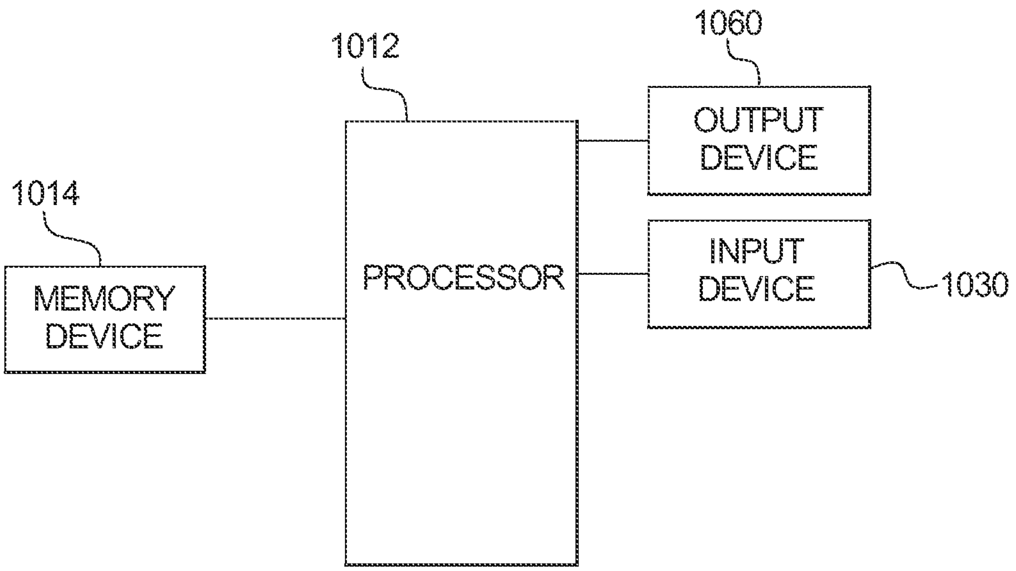
FIG. 3B is a schematic block diagram of an example electronic configuration of an EGM of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
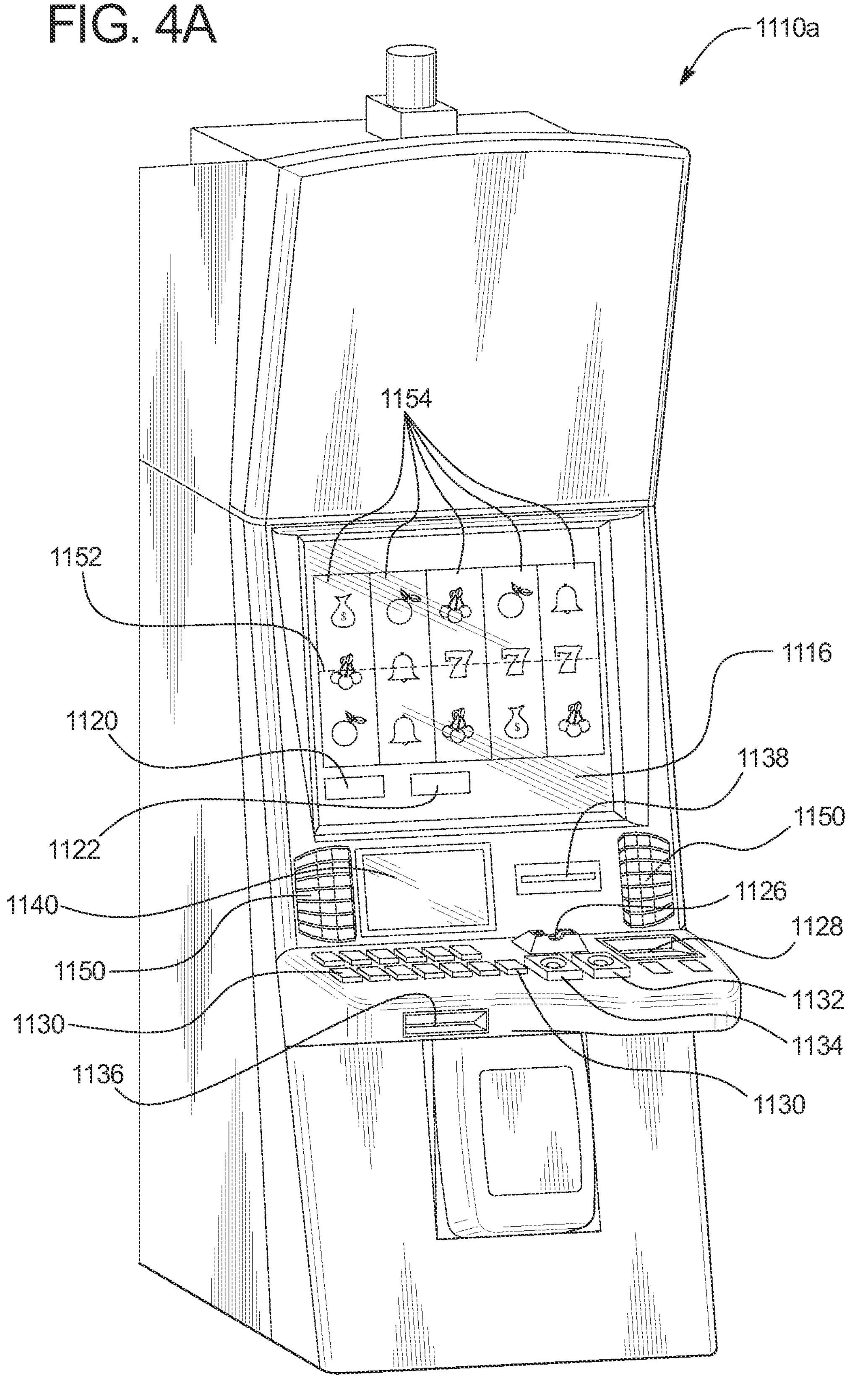
FIGS. 4A and 4B are perspective views of example alternative embodiments of EGMs of the present disclosure.
Figure 4B:
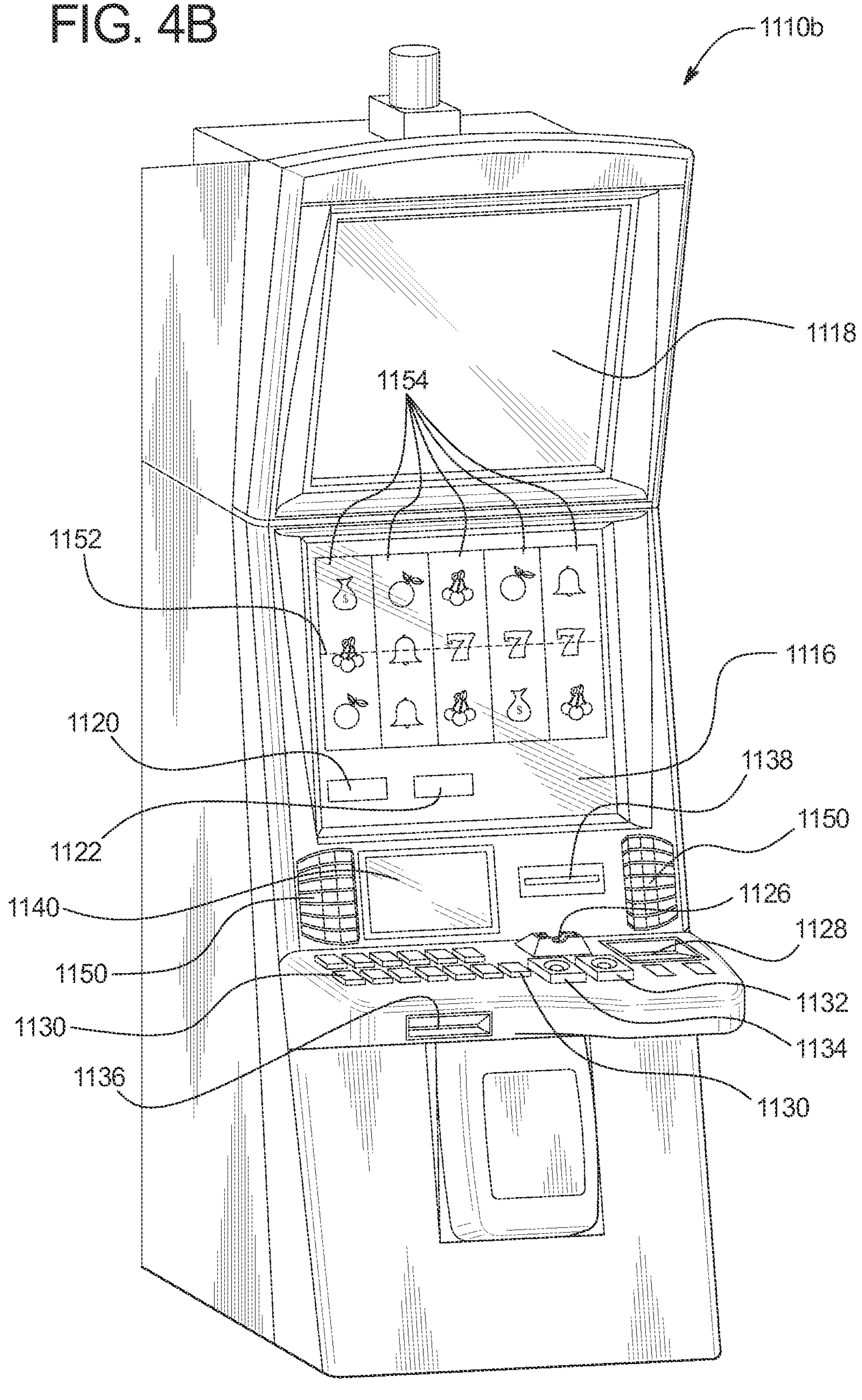

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements.

As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor; and at least one memory device storing a plurality of instructions which, when executed by the at least one processor, cause the at least one processor to:

(a) enable a player to play one or more wagering games during a gaming session;

(b) determine whether a termination causation event predicted to cause termination of the gaming session occurs during the gaming session; and (c) if the termination causation event occurs:

(i) provide an incentive to the player and cause at least one display device to display the provided incentive;

(ii) determine whether the provided incentive is effective at causing the player to delay termination of the gaming session; and (iii) if the provided incentive is not effective at causing the player to delay termination of the gaming session, modify at least one aspect of the provided incentive for a subsequent gaming session of the player such that the modified incentive is provided if the termination causation event occurs during the subsequent gaming session.

2. The gaming system of claim 1, wherein the provided incentive is effective at causing the player to delay termination of the gaming session if the gaming session continues for one of: (a) at least a predetermined period of time after the incentive is provided, and (b) at least a predetermined quantity of plays of the wagering games after the incentive is provided.

3. The gaming system of claim 1, wherein the provided incentive is ineffective at causing the player to delay termination of the gaming session if the gaming session continues for one of: (a) less than a predetermined period of time after the incentive is provided, and (b) fewer than a predetermined quantity of plays of the wagering games after the incentive is provided.

4. The gaming system of claim 1, wherein the provided incentive includes an incentive type and a value, and the plurality of instructions, when executed by the at least one processor, cause the at least one processor to modify at least on aspect of the provided incentive by one of: (a) modifying the incentive type of the provided incentive, (b) modifying the value of the provided incentive, and (c) modifying the incentive type and the value of the provided incentive.

5. The gaming system of claim 1, wherein the plurality of instructions, when executed by the at least one processor, cause the at least one processor to modify at least one aspect of the provided incentive based on one or more of: (a) the effectiveness of one or more other incentives previously provided to the player, and (b) the effectiveness of one or more other incentives previously provided to one or more other players.

6. The gaming system of claim 1, wherein the plurality of instructions, when executed by the at least one processor, cause the at least one processor to, if the provided incentive is effective at causing the player to delay termination of the gaming session, modify an incentive type of the provided incentive for the subsequent gaming session of the player.

7. A method of operating a gaming system, said method comprising:

(a) causing at least one processor to execute a plurality of instructions stored in at least one memory device to enable a player to play one or more wagering games during a gaming session;

(b) causing the at least one processor to execute the plurality of instructions to determine whether a termination causation event predicted to cause termination of the gaming session occurs during the gaming session; and (c) if the termination causation event occurs:

(i) providing an, incentive to the player and causing the at least one processor to, execute the plurality of instructions to cause at least one display device to display the provided incentive;

(ii) causing the at least one processor to execute the plurality of instructions to determine whether the provided incentive is effective at causing the player to delay termination of the gaming session; and (iii) if the provided incentive is not effective at causing the player to delay termination of the gaming session, causing the at least one processor to execute the plurality of instructions to modify at least one aspect of the provided incentive for a subsequent gaming session of the player such that the modified incentive is provided if the termination causation event occurs during the subsequent gaming session.

8. The method of claim 7, wherein the provided incentive is effective at causing the player to delay termination of the gaming session if the gaming session continues for one of: (a) at least a predetermined period of time after the incentive is provided, and (b) at least a predetermined quantity of plays of the wagering games after the incentive is provided.

9. The method of claim 7, wherein the provided incentive is ineffective at causing the player to delay termination of the gaming session if the gaming session continues for one of: (a) less than a predetermined period of time after the incentive is provided, and (b) fewer than a predetermined quantity of plays of the wagering games after the incentive is provided.

10. The method of claim 7, wherein the provided incentive includes an incentive type and a value, and which includes causing the at least one processor to execute the plurality of instructions to modify at least on aspect of the provided incentive by one of: (a) modifying the incentive type of the provided incentive, (b) modifying the value of the provided incentive, and (c) modifying the incentive type and the value of the provided incentive.

11. The method of claim 7, which includes causing the at least one processor to execute the plurality of instructions to modify at least one aspect of the provided incentive based on one or more of: (a) the effectiveness of one or more other incentives previously provided to the player, and (b) the effectiveness of one or more other incentives previously provided to one or more other players.

12. The method of claim 7, which includes causing the at least one processor to execute the plurality of instructions to, if the provided incentive is effective at causing the player to delay termination of the gaming session, modify an incentive type of the provided incentive for the subsequent gaming session of the player.

13. The method of claim 7, which is provided through a data network.

14. The method of claim 13, wherein the data network is an internet.

15. A non-transitory computer readable medium including a plurality of instructions which, when executed by at least one processor, cause the at least one processor to:

(a) enable a player to play one or more wagering games during a gaming session;

(b) determine whether a termination causation event predicted to cause termination of the gaming session occurs during the gaming session; and (c) if the termination causation event occurs:

(i) provide an incentive to the player and cause at least one display device to display the provided incentive;

(ii) determine whether the provided incentive is effective at causing the player to delay termination of the gaming session; and (iii) if the provided incentive is not effective at causing the player to delay termination of the gaming session, modify at least one aspect of the provided incentive for a subsequent gaming session of the player such that the modified incentive is provided if the termination causation event occurs during the subsequent gaming session.

16. The non-transitory computer readable medium of claim 15, wherein the provided incentive is effective at causing the player to delay termination of the gaming session if the gaming session continues for one of: (a) at least a predetermined period of time after the incentive is provided, and (b) at least a predetermined quantity of plays of the wagering games after the incentive is provided.

17. The non-transitory computer readable medium of claim 15, wherein the provided incentive is ineffective at causing the player to delay termination of the gaming session if the gaming session continues for one of: (a) less than a predetermined period of time after the incentive is provided, and (b) fewer than a predetermined quantity of plays of the wagering games after the incentive is provided.

18. The non-transitory computer readable medium of claim 15, wherein the provided incentive includes an incentive type and a value, and the plurality of instructions, when executed by the at least one processor, cause the at least one processor to modify at least on aspect of the provided incentive by one of: (a) modifying the incentive type of the provided incentive, (b) modifying the value of the provided incentive, and (c) modifying the incentive type and the value of the provided incentive.

19. The non-transitory computer readable medium of claim 15, wherein the plurality of instructions, when executed by the at least one processor, cause the at least one processor to modify at least one aspect of the provided incentive based on one or more of: (a) the effectiveness of one or more other incentives previously provided to the player, and (b) the effectiveness of one or more other incentives previously provided to one or more other players.

20. The non-transitory computer readable medium of claim 15, wherein the plurality of instructions, when executed by the at least one processor, cause the at least one processor to, if the provided incentive is effective at causing the player to delay termination of the gaming session, modify an incentive type of the provided incentive for the subsequent gaming session of the player.

* * * * *